US011046800B2

(12) United States Patent
Takahashi et al.

(10) Patent No.: US 11,046,800 B2
(45) Date of Patent: Jun. 29, 2021

(54) RESIN COMPONENT DISPOSED IN ROUTE OF BEAM EMITTED BY RADAR DEVICE, RADOME, AND RADAR DEVICE

(71) Applicant: Techno-UMG Co., Ltd., Minato-ku (JP)

(72) Inventors: Yutaro Takahashi, Minato-ku (JP); Shinsuke Fujioka, Minato-ku (JP)

(73) Assignee: Techno-UMG Co., Ltd., Minato-ku (JP)

(*) Notice: Subject to any disclaimer, the term of this patent is extended or adjusted under 35 U.S.C. 154(b) by 323 days.

(21) Appl. No.: 16/061,436

(22) PCT Filed: Dec. 14, 2016

(86) PCT No.: PCT/JP2016/087254
§ 371 (c)(1),
(2) Date: Jun. 12, 2018

(87) PCT Pub. No.: WO2017/104714
PCT Pub. Date: Jun. 22, 2017

(65) Prior Publication Data
US 2020/0262958 A1      Aug. 20, 2020

(30) Foreign Application Priority Data

Dec. 16, 2015 (JP) .............................. JP2015-245621
Jun. 20, 2016 (JP) .............................. JP2016-122104
Jun. 28, 2016 (JP) .............................. JP2016-128058
Jun. 29, 2016 (JP) .............................. JP2016-129279

(51) Int. Cl.
| | |
|---|---|
| C08F 255/04 | (2006.01) |
| C08F 265/04 | (2006.01) |
| C08F 283/12 | (2006.01) |
| G01S 7/03 | (2006.01) |
| H01Q 1/40 | (2006.01) |
| H01Q 1/42 | (2006.01) |
| B32B 27/20 | (2006.01) |
| B32B 27/08 | (2006.01) |

(52) U.S. Cl.
CPC ............ *C08F 255/04* (2013.01); *B32B 27/08* (2013.01); *B32B 27/20* (2013.01); *C08F 265/04* (2013.01); *C08F 283/124* (2013.01); *G01S 7/03* (2013.01); *H01Q 1/405* (2013.01); *H01Q 1/42* (2013.01); *B32B 2255/10* (2013.01); *B32B 2307/734* (2013.01)

(58) Field of Classification Search
CPC .. C08F 255/04; C08F 283/124; C08F 265/04; H01Q 1/405; H01Q 1/42; G01S 7/03
USPC ....................................................... 428/500
See application file for complete search history.

(56) References Cited

U.S. PATENT DOCUMENTS

| | | |
|---|---|---|
| 5,689,276 A | 11/1997 | Uematsu et al. |
| 2004/0125023 A1 | 7/2004 | Fujii et al. |
| 2004/0227663 A1 | 11/2004 | Suzuki et al. |
| 2005/0237261 A1 | 10/2005 | Fujii et al. |
| 2007/0229374 A1 | 10/2007 | Shimura |
| 2013/0217817 A1 | 8/2013 | Mochizuki et al. |
| 2016/0185949 A1 | 6/2016 | Mochizuki et al. |

FOREIGN PATENT DOCUMENTS

| | | | |
|---|---|---|---|
| CN | 1957505 A | 5/2007 | |
| CN | 103108915 A | 5/2013 | |
| EP | 2 514 591 A1 | 10/2012 | |
| JP | 07-283637 A | 10/1995 | |
| JP | 2003-317704 | 11/2003 | |
| JP | 2004-251816 A | 9/2004 | |
| JP | 2004-251868 A | 9/2004 | |
| JP | 2004-312696 A | 11/2004 | |
| JP | 2005-348032 A | 12/2005 | |
| JP | 2007-013722 A | 1/2007 | |
| JP | 2007013722 A | * 1/2007 | ............... G01S 7/03 |
| JP | 2009-124485 A | 6/2009 | |
| JP | 2013-043942 A | 3/2013 | |
| JP | 2016-121307 A | 7/2016 | |

OTHER PUBLICATIONS

JP-2007013722-A, Jan. 2007, Derwent Ab. (Year: 2007).*
Extended European Search Report dated Jul. 23, 2019, in Patent Application No. 16875691.4, 8 pages.
Japanese Office Action dated Jun. 2, 2020, in Patent Application No. 2017-556103, 11 pages (with unedited computer generated English translation).
International Search Report dated Mar. 7, 2017 in PCT/JP2016/087254, filed on Dec. 14, 2016.
Combined Office Action and Search Report dated Nov. 28, 2019 in Chinese Patent Application No. 201680065095.2, 17 pages (with English translation and English translation of categories of cited references).

(Continued)

*Primary Examiner* — Hui H Chin
(74) *Attorney, Agent, or Firm* — Oblon, McClelland, Maier & Neustadt, L.L.P.

(57) ABSTRACT

The present invention is a resin component disposed in a path of a beam emitted from a radar equipment, the resin component consisting of a thermoplastic resin composition containing at least one thermoplastic resin selected from a group consisting of a rubbery polymer-reinforced vinyl-based resin wherein a polymer part derived from a rubbery polymer and a vinyl-based resin part containing a structural unit derived from a vinyl-based monomer are chemically bonded, a polyolefin resin, and a polycarbonate resin, and having a dielectric constant of 2.9 or less, and a mold shrinkage rate of 1.2% or less as measured in accordance with JIS K 7152-4. This resin component can be used as a radome and may constitute part of a radar device.

10 Claims, 6 Drawing Sheets

(56) References Cited

OTHER PUBLICATIONS

Office Action dated May 12, 2020 in corresponding Chinese Patent Application No. 201680065095.2 (with English Translation), 14 pages.

Office Action as received in the corresponding Japanese patent application No. 2017-556103 dated Apr. 6, 2021 w/English Translation, Citing document AW, 12 pages.

\* cited by examiner 36 34 32

38 34 32
38

RESIN COMPONENT DISPOSED IN ROUTE OF BEAM EMITTED BY RADAR DEVICE, RADOME, AND RADAR DEVICE

TECHNICAL FIELD

The present invention relates to a resin component disposed in a path of a beam emitted by a radar equipment, the resin component having a low dielectric constant and a low dielectric loss tangent, and being excellent in transmission of an electromagnetic wave such as a millimeter wave, a radome (antenna cover) storing or protecting an antenna module which transmits or receives an electromagnetic wave, and a radar equipment.

BACKGROUND ART

Conventionally, wireless communication having a radar equipment that transmits and receives a millimeter wave which is an electromagnetic wave ranging from 30 GHz to 300 GHz, a sensors and others have been actively developed, and their applications are widely proposed. Some of them are already commercialized, such as sensors and imaging equipment for security check which instantaneously detect the location and speed of moving persons, objects, and the like.

A radar equipment usually includes an antenna module which transmits or receives an electromagnetic wave, and a radome which stores or protects the antenna module. Of these, the radome is usually of a resin compact, and has various shapes according to the use. Some of them are entirely formed of a material which easily transmits an electromagnetic wave. Alternatively, only the specific portions corresponding to the path of the electromagnetic wave are formed of a material which easily transmits an electromagnetic wave.

For example, the materials forming a radome composing a radar equipment for a millimeter wave are disclosed in the following Patent Documents 1 t 3, and the like.

Patent Document 1 discloses a millimeter wave radar including an antenna base having a transmit/receive antenna (antenna module), a housing for fixing the antenna base, and a radome and/or a radar cover for covering the antenna base, wherein in the radome or radar cover, the dielectric constant of the part in the side direction of the transmit/receive antenna is greater than the dielectric constant of the front part of the transmit/receive antenna. Additionally, there is a statement that the radome or radar cover in the front part of the transmit/receive antenna contains mainly polycarbonate, syndiotactic polystyrene, polypropylene, or a hybrid with an ABS resin composed mainly of any of these resins.

Patent Document 2 discloses a resin compact which has a decorative layer between a base material layer and a transparent resin layer, and is disposed in a beam path of an electric wave radar equipment, which is formed from a thermoplastic resin having a dielectric loss tangent of 0.0005 or less and a dielectric constant of 3 or less at the frequency of the beam.

Patent Document 3 discloses a resin composition containing a polybutylene terephthalate resin, which is suitable as a material for a component demanded to have a low dielectric constant, such as a circuit base material and a radome, and a cyclic olefin resin having a glass transition temperature of 100° C. or higher.

PRIOR TECHNICAL DOCUMENT

Patent Document

[Patent Document 1] JP-A 2004-312696
[Patent Document 2] JP-A 2007-13722
[Patent Document 3] JP-A 2013-43942

SUMMARY OF THE INVENTION

Problems that the Invention is to Solve

As described above, there are a radar equipment having a radome wherein only the specific portion corresponding to a path of a beam (electromagnetic wave) is formed of a material which easily transmits an electromagnetic wave, and a radar equipment having a radome entirely formed of a material which easily transmits an electromagnetic wave. In both of them, the portion corresponding to the path of a beam (electromagnetic wave) must have at least marked dielectric characteristic, mechanical characteristic, or dimensional stability.

An object of the present invention is to provide a resin component which is disposed in a path of a beam emitted from a radar equipment, specifically a resin component having marked transmission of an electromagnetic wave such as a millimeter wave, impact resistance, heat resistance, dimensional stability and the like, a radome and a radar equipment including the same.

Another object of the present invention to provide is a resin component disposed in a path of a beam emitted from a radar equipment, specifically a resin laminate having marked transmission of an electromagnetic wave such as a millimeter wave, a radome and a radar equipment including the same.

Means for Solving the Problems

The present invention is a radar equipment, and a resin component that is consisting of a compact or laminate, is disposed in a path of a beam emitted from a radar equipment (hereinafter, referred to as "electromagnetic wave transmitable resin component"), and is suitable for a radome as a member composing the radar equipment, or a component member of a radome or the like.

The resin component disposed in a path of a beam emitted from a radar equipment in the present invention is a resin component that consists of a thermoplastic resin composition including at least one thermoplastic resin selected from a group consisting of a rubbery polymer-reinforced vinyl-based resin wherein a polymer part derived from a rubbery polymer and a vinyl-based resin part containing a structural unit derived from a vinyl-based monomer are chemically bonded, a polyolefin resin, and a polycarbonate resin, and that has a dielectric constant of 2.9 or less, and a mold shrinkage rate of 1.2% or less as measured in accordance with JIS K 7152-4 (hereinafter, referred to as "electromagnetic wave transmitable resin component (I)").

In the electromagnetic wave transmitable resin component (I), the rubbery polymer is preferably at least one selected from a group consisting of a diene-based rubber, an acrylic rubber, an ethylene α-olefin-based rubber, a hydrogenated diene-based rubber, and a silicone rubber.

In the electromagnetic wave transmitable resin component (I), the rubbery polymer is preferably an ethylene α-olefin-based rubber, and the ethylene α-olefin-based rubber is preferably an ethylene α-olefin copolymer in which a content of an ethylene unit is in a range from 50% to 95% by mass.

In the electromagnetic wave transmitable resin component (I), a melting point of the ethylene α-olefin-based rubber in accordance with JIS K 7121-1987 is preferably in a range from 0° C. to 120° C.

In the electromagnetic wave transmitable resin component (I), the thermoplastic resin preferably includes further an inorganic filler.

In the electromagnetic wave transmitable resin component (I), the inorganic filler preferably includes at least one selected from a group consisting of a talc particle, carbon-black, and an alumina particle.

In the electromagnetic wave transmitable resin component (I), a content of the inorganic filler is preferably in a range from 0.1 to 40 parts by mass based on 100 parts by mass of the thermoplastic resin.

In the electromagnetic wave transmitable resin component (I), the thermoplastic resin preferably includes a rubbery polymer-reinforced vinyl-based resin having a polymer part derived from ethylene α-olefin-based rubber and a vinyl-based resin part, and the polyolefin resin, and the content ratios of the rubbery polymer-reinforced vinyl-based resin and the polyolefin resin are respectively preferably 30% to 95% by mass and 5% to 70% by mass based on 100% by mass of a total of these resins.

In the electromagnetic wave transmitable resin component (I), the thermoplastic resin preferably includes a rubbery polymer-reinforced vinyl-based resin having a polymer part derived from ethylene α-olefin-based rubber and a vinyl-based resin part, and the polycarbonate resin, and content ratios of the rubbery polymer-reinforced vinyl-based resin and the polycarbonate resin are respectively preferably 35% to 95% by mass and 5% to 65% by mass based on 100% by mass of a total of these resins.

In the electromagnetic wave transmitable resin component (I), the thermoplastic resin composition preferably includes further a (co)polymeric resin containing at least one selected from a group consisting of a structural unit derived from an aromatic vinyl compound, a structural unit derived from a cyanidated vinyl compound, and a structural unit derived from a (meth)acrylic acid alkyl ester compound.

In the electromagnetic wave transmitable resin component (I), the thermoplastic resin preferably consists of the rubbery polymer-reinforced vinyl-based resin, the (co)polymeric resin and the polyolefin resin.

In the electromagnetic wave transmitable resin component (I), content ratios of a total of the rubbery polymer-reinforced vinyl-based resin and the (co)polymeric resin, and the polyolefin resin are respectively preferably 30% to 95% by mass and 5% to 70% by mass based on 100% by mass of a total of the rubbery polymer-reinforced vinyl-based resin, the (co)polymeric resin and the polyolefin resin.

In the electromagnetic wave transmitable resin component (I), the resin component is preferably a radome or a decorative member.

The radome of the present invention is an article having the electromagnetic wave transmitable resin component (I) and other component.

The radar equipment of the present invention is an article having the electromagnetic wave transmitable resin component (I).

In the other invention, the resin component isposed in a path of a beam emitted from a radar equipment is a resin component that has a base resin layer containing a resin material (X), and a transparent resin layer containing a resin material (Y) and being placed at a first surface side of the base resin layer, and that has a difference between a dielectric constant of the resin material (X) and a dielectric constant of the resin material (Y) of 0.05 or less (hereinafter, referred to as "electromagnetic wave transmitable resin component (II)").

In the electromagnetic wave transmitable resin component (II), the resin material (X) preferably includes a thermoplastic resin and an inorganic filler, the thermoplastic resin preferably includes at least one selected from a group consisting of a rubbery polymer-reinforced vinyl-based resin, a polyolefin resin, an acrylic resin, and a polycarbonate resin, and a content of the inorganic filler is preferably in a range from 0.1 to 40 parts by mass based on 100 parts by mass of a content of the thermoplastic resin.

In the electromagnetic wave transmitable resin component (II), a dielectric loss tangent of the resin material (X) is preferably $8.3 \times 10^{-3}$ or less.

In the electromagnetic wave transmitable resin component (II), the rubbery polymer-reinforced vinyl-based resin preferably includes a polymer part derived from an ethylene α-olefin-based rubber and a vinyl-based resin part.

In the electromagnetic wave transmitable resin component (II), the inorganic filler preferably includes at least one selected from a group consisting of a talc particle, carbon-black, and an alumina particle.

In the electromagnetic wave transmitable resin component (II), the resin material (Y) preferably includes a polycarbonate resin or an acrylic resin.

The radome in the other invention is an article having the electromagnetic wave transmitable resin component (II).

The radar equipment in the other invention is an article having the electromagnetic wave transmitable resin component (II).

In the present specification, "(Meth)acryl" means acryl and methacryl; "(meth)acrylate" means acrylate and methacrylate; "(meth)acryloyl group" means acryloyl group and methacryloyl group; and "(co)polymer" means homopolymer and copolymer.

The melting point of the thermoplastic resin according to JIS K 7121 (hereinafter denoted as "Tm") is the value obtained by measuring the endothermic change using a differential scanning calorimeter (DSC) at a constant temperature rising rate of 20° C. per minute, and reading the peak temperature of the endothermic pattern thus obtained.

Additionally, "transmits an electromagnetic wave" means that the object has performance that the dielectric constant at a frequency of about 77 GHz is 2.8 or less as measured in accordance with JIS R 1660-1, and the dielectric loss tangent (tan δ) is $9.0 \times 10^{-3}$ or less in the present specification.

Effects of the Invention

The electromagnetic wave transmitable resin component (I) of the present invention is made of a resin material having a low dielectric constant and a small dielectric loss tangent (tan δ), and thus can transmit an electromagnetic wave such as a millimeter wave without reflecting or absorbing it, and is suitable as a radome and a component of a radar equipment because it has marked impact resistance, heat resistance, and the like.

The radome of the present invention includes the electromagnetic wave transmitable resin component (I) of the present invention, and thus is suitable for storage or protection of an antenna module which transmits or receives an electromagnetic wave such as a millimeter wave. The whole of the radome of the present invention may be composed solely of the electromagnetic wave transmitable resin component (I) of the present invention, or only the part corresponding the channel involved in transmission or reception of an electromagnetic wave may be solely composed of the electromagnetic wave transmitable resin component (I) of the present invention.

The radar equipment of the present invention is suitable as equipment for transmitting or receiving an electromagnetic wave such as a millimeter wave.

The electromagnetic wave transmitable resin component (II) of the present invention can prevent refraction and reflection of an electromagnetic wave such as a millimeter wave in its cross section direction, can reduce permeation deficit, and thus is suitable as, for example, a radome disposed in the path of a beam emitted from a radar equipment, a decorative member, and the like. Accordingly, it is suitable as a component member of a radar equipment.

The radome in the other invention includes the electromagnetic wave transmitable resin component (II) of the present invention, and thus is suitable for storage or protection of an antenna module which transmits or receives an electromagnetic wave such as a millimeter wave. The whole of the radome of the present invention may be composed solely of the electromagnetic wave transmitable resin component (II) of the present invention, or only the part corresponding the channel involved in transmission or reception of an electromagnetic wave may be solely composed of the electromagnetic wave transmitable resin component (II) of the present invention.

The radar equipment in the other invention is suitable as equipment for transmitting or receiving an electromagnetic wave such as a millimeter wave.

EMBODIMENTS FOR CARRYING OUT THE INVENTION

The present invention relates to the electromagnetic wave transmitable resin component (I) disposed in a path of a beam emitted from a radar equipment, the electromagnetic wave transmitable resin component (I) being composed of a thermoplastic resin composition containing at least one thermoplastic resin selected from a group consisting of a rubbery polymer-reinforced vinyl-based resin in which a polymer part derived from a rubbery polymer and a vinyl-based resin part containing a structural unit derived from a vinyl-based monomer are chemically bonded, a polyolefin resin, and a polycarbonate resin, having a dielectric constant of 2.9 or less, and having a mold shrinkage rate of 1.20 or less as measured in accordance with JIS K 7152-4; a radome including the electromagnetic wave transmitable resin component (I); and a radar equipment including the radome and an antenna module, and examples of these objects are depicted in FIGS. 1 to 7.

Figure 1:
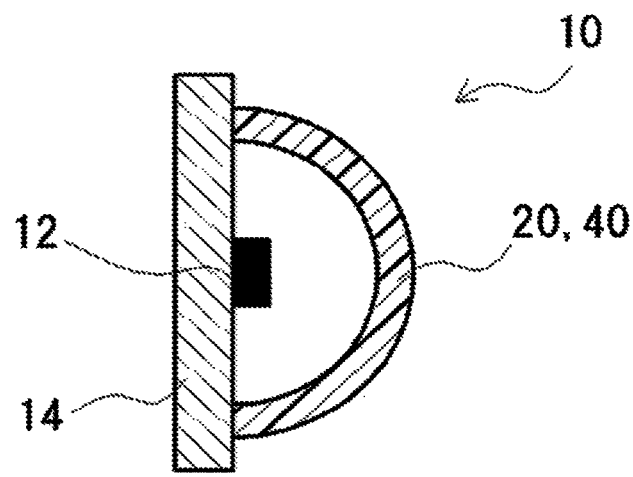
FIG. 1 is schematic cross sectional views showing an example of an electromagnetic wave transmitable resin component (I), a radome and a radar equipment including the same in the present invention.
Figure 2:
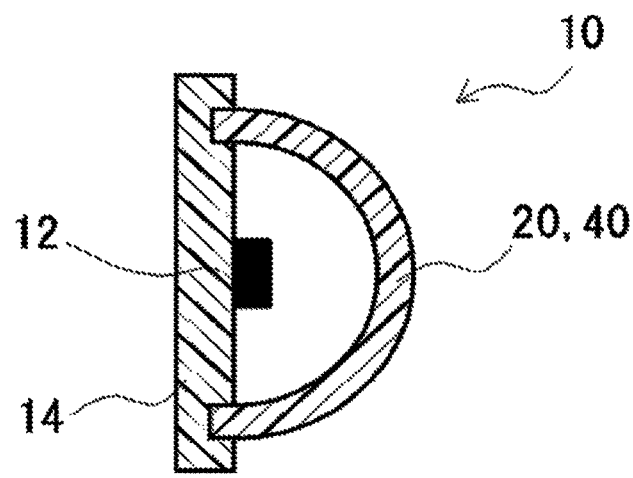
FIG. 2 is schematic cross sectional views showing another example of an electromagnetic wave transmitable resin component (I), a radome and a radar equipment including the same in the present invention.
Figure 3:
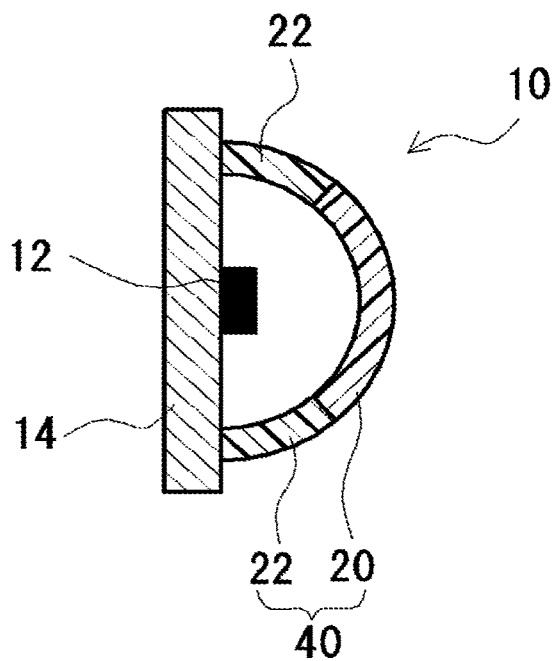
FIG. 3 is schematic cross sectional views showing another example of an electromagnetic wave transmitable resin component (I), a radome and a radar equipment including the same in the present invention.

In FIGS. 1 to 7, the electromagnetic wave transmitable resin component (I) of the present invention is a resin component indicated with numeral 20. Additionally, the radome of the present invention is a component indicated with numeral 40 which stores or protects an antenna module transmitting or receiving an electromagnetic wave such as a millimeter wave. The radome may be an object made solely of an electromagnetic wave transmitable resin component 20 as indicated in FIGS. 1 and 2, or a composite object including an electromagnetic wave transmitable resin component 20 and other component 22 as depicted in FIG. 3. The electromagnetic wave transmitable resin component (I) and radome in the present invention lead to a radar equipment suitable for, for example, wireless communication, a sensor and others.

The other present invention relates to the electromagnetic wave transmitable resin component (II) disposed in a path of a beam emitted from a radar equipment, a radome including the electromagnetic wave transmitable resin component (II), and a radar equipment including the radome and an antenna module, the electromagnetic wave transmitable resin component (II) including a base resin layer containing the resin material (X), and a transparent resin layer containing the resin material (Y) and disposed on a first surface side of the base resin layer, wherein the difference between the dielectric constant of the resin material (X) and the dielectric constant of the resin material (Y) is 0.05 or less.

Firstly, the electromagnetic wave transmitable resin component (I) of the present invention is described. The thermoplastic resin composition included in the electromagnetic wave transmitable resin component (I) (hereinafter, referred to as "first thermoplastic resin composition") may be a composition consisting of only a thermoplastic resin (hereinafter, referred to as "first thermoplastic resin"), or of a composition which further contains an additive (below-described).

The rubbery polymer-reinforced vinyl-based resin is a resin wherein a rubbery polymer part and a vinyl-based resin part are chemically bonded, and preferably a graft resin wherein a rubbery polymer part and a vinyl-based resin part are chemically bonded obtained by polymerizing a vinyl-based monomer in the presence of a rubbery polymer, and particularly preferably a resin wherein a rubbery polymer part and a vinyl-based resin part derived from a (co)polymer of a vinyl-based monomer are chemically bonded obtained by polymerizing a vinyl-based monomer in the presence of at least one rubbery polymer selected from the group consisting of a diene-based rubber, an acrylic rubber, an ethylene α-olefin-based rubber, a hydrogenated diene-based rubber and a silicone rubber.

The rubbery polymer forming the rubbery polymer part may be a homopolymer or a copolymer as long as it is rubbery at a temperature of 25° C. The rubbery polymer may be a crosslinked polymer or a non-crosslinked polymer.

Examples of the diene-based rubber include a homopolymer such as polybutadiene, polyisoprene and polychloroprene; a styrene butadiene-based copolymer rubber such as a styrene butadiene copolymer, a styrene butadiene styrene copolymer, an acrylonitrile butadiene copolymer and an acrylonitrile styrene butadiene copolymer; a styrene isoprene-based copolymer rubber such as a styrene isoprene copolymer, a styrene isoprene-styrene copolymer, and an acrylonitrile styrene-isoprene copolymer; and the like. The copolymer may be a block copolymer or a random copolymer.

The acrylic rubber is preferably a rubber obtained by (co)polymerizing a monomer containing a (meth)acrylic acid alkyl ester-based compound such as methyl acrylate, ethyl acrylate, n-propyl acrylate, n-butyl acrylate, 2-ethylhexyl acrylate, ethoxyethoxyethyl acrylate, methoxytripropyleneglycol acrylate, 4-hydroxybutyl acrylate, lauryl methacrylate and stearyl methacrylate. The (meth)acrylic acid alkyl ester-based compound may be used singly or in combination of two or more types thereof.

The monomer may contain, besides the (meth)acrylic acid alkyl ester-based compound, other vinyl-based monomer such as an aromatic vinyl compound including styrene, α-methyl styrene and vinyl toluene; a cyanidated vinyl compound including acrylonitrile and methacrylonitrile; a methacrylic acid-modified silicone; and a fluorine-containing vinyl compound in an amount of 30% or less by mass.

The ethylene α-olefin-based rubber is a copolymer rubber composed of a structural unit derived from ethylene and a structural unit derived from an α-olefin, or a copolymer rubber which further contains, in addition to these structural units, a structural unit derived from a non-conjugated diene. When the first thermoplastic resin contains a rubbery polymer part derived from an ethylene α-olefin-based rubber, a lower limit of an amount of the ethylene unit included in the ethylene α-olefin-based rubber is preferably 30% by mass, more preferably 40% by mass, further preferably 45% by mass, and particularly 50% by mass, and an upper limit of an amount of the ethylene unit is preferably at 95% by mass, more preferably 90% by mass, further preferably 85% by mass, furthermore preferably 80% by mass, and particularly 75% by mass, from viewpoints of mechanical characteristic and molding appearance in the electromagnetic wave transmitable resin component (I) of the present invention.

Examples of the α-olefin include propylene, 1-butene, 1-pentene, 1-hexene, 4-methyl-1-pentene, 1-heptene, 1-octene, 1-decene, 1-dodecene, 1-hexadecene, 1-eicosene, and the like. The α-olefin may be used singly or in combination of two or more types thereof. A number of carbon atom in the α-olefine is preferably in a range from 3 to 20, more preferably from 3 to 12, and further preferably from 3 to 8 from viewpoints of mechanical characteristic and molding appearance in the electromagnetic wave transmitable resin component (I) of the present invention.

Examples of the non-conjugated diene include an alkenyl norbornene, a cyclic diene, an aliphatic diene, and the like. The non-conjugated diene may be used singly or in combination of two or more types thereof.

When the ethylene α-olefin-based rubber is an ethylene α-olefin non-conjugated diene copolymer rubber, an upper limit of a content of the structural unit derived from the non-conjugated diene is preferably 15% by mass, more preferably 10% by mass, and further preferably 5% by mass, based on 100% by mass of a total amount of the structural units included in the ethylene α-olefin-based rubber.

The ethylene α-olefin-based rubber is, from a viewpoint of transmission of electromagnetic wave, preferably an ethylene α-olefin copolymer having a Tm ranging from 0° C. to 120° C., more preferably from 10° C. to 100° C., and further more preferably from 30° C. to 80° C. The ethylene α-olefin-based rubber is more preferably a copolymer including a structural unit derived from ethylene and a structural unit derived from α-olefin having a carbon atom number of 3 to 8. The ethylene α-olefin-based rubber is further preferably an ethylene propylene copolymer, an ethylene 1-butene copolymer and an ethylene 1-octene copolymer, and particularly an ethylene propylene copolymer.

The hydrogenated diene-based rubber is obtained by hydrogenation of a homopolymer or copolymer having structural unit derived from a conjugated diene-based compound such as 1,3-butadiene, isoprene, piperylene, 1,3-pentadiene, methylpentadiene, phenyl butadiene, 3,4-dimethyl-1,3-hexadiene, 4,5-diethyl-1,3-octadiene and chloroprene (hereinafter, referred to as "hydrogenated diene-based (co)polymerized rubber").

Examples of the hydrogenated diene-based (co)polymerized rubber include a hydrogenated block copolymer having the following structure. More specific example is a block copolymer composed of a combination of two or more of the followings: a polymer block P composed of a structural unit derived from an aromatic vinyl compound; a polymer block Q prepared by hydrogenating 95% or more by mol of a double bond part of the polymer composed of a structural unit derived from a conjugated diene-based compound containing more than 25% by mol of 1,2-vinyl bond; a polymer block R prepared by hydrogenating 95% or more by mol of a double bond part of the polymer composed of a structural unit derived from a conjugated dien-based e compound containing 25% or less by mol of 1,2-vinyl bond; and a polymer block S prepared by hydrogenating 95% or more by mol of the double bond part of the copolymer composed of a structural unit derived from an aromatic vinyl compound and a structural unit derived from a conjugated diene-based compound.

The molecular structure of the block copolymer may be branched, radial, or a combination of them. The block structure may be diblock, triblock, multi-block, or a combination of them.

Examples of the structure of the block copolymer include P-(Q-P)$_n$, (P-Q)$_n$, P-(Q-R)$_n$, R-(Q-R)$_n$, (Q-R)$_n$, P-(S-P)$_n$, (P-S)$_n$, P-(S-R)$_n$, R-(S-R)$_n$, (S-R)$_n$, P-(Q-R-S)$_n$, (P-Q-R-S)$_n$ [wherein n is an integer of 1 or more] and the like. Preferable structures are P-Q-P, P-Q-P-Q, P-Q-R, P-S-R, and R-Q-R.

Examples of the aromatic vinyl compound used for the formation of the polymer blocks P and S included in the block copolymer include styrene, α-methyl styrene, methyl styrene, vinyl xylene, monochlorostyrene, dichlorostyrene, monobromostyrene, dibromostyrene, fluorostyrene, p-tert-butyl styrene, ethyl styrene, vinylnaphthalene, and the like. These compounds may be used singly or in combination of two or more types thereof. Among these, styrene is preferred.

A content ratio of the polymer block P included in the block copolymer is preferably in a range from 0% to 65% by mass and more preferably from 10% to 40% by mass with reference to whole of the polymer.

The polymer blocks Q, R, and S are formed by hydrogenation of a block copolymer before hydrogenation obtained using a conjugated diene-based compound and an aromatic vinyl compound. Examples of the conjugated diene compound used for the formation of the polymer blocks Q, R, and S include 1,3-butadiene, isoprene, 1,3-pentadiene, chloroprene, and the like. These compounds may be used singly or in combination of two or more types thereof. Among these, 1,3-butadiene and isoprene are preferred because they are suitable for industrial use and have marked physical properties.

The hydrogenation ratios of the polymer blocks Q, R, and S are 95% or more by mol, and preferably 96% or more by mol.

A content of 1,2-vinyl bond in the polymer block Q is preferably more than 25% by mol and 900 or less by mol, and more preferably from 30% to 80% by mol.

A content of 1,2-vinyl bond in the polymer block R is preferably 25% or less by mol, and more preferably 20% or less by mol.

A content of 1,2-vinyl bond in the polymer block S is preferably in a range from 25% to 90% by mol, and more preferably from 30% to 80% by mol.

A content ratio of the structural unit derived from the aromatic vinyl compound in the polymer block S is preferably 25% or less by mass and more preferably 20% or less by mass.

Examples of the hydrogenated diene-based (co)polymerized rubber include a hydrogenated polybutadiene; a hydrogenated styrene butadiene-based rubber; hydrogenated products of a styrene ethylene butylene olefin crystal block polymer, an olefin crystal ethylene butylene olefin crystal block polymer, a styrene ethylene butylene styrene block polymer, and a butadiene acrylonitrile copolymer; and the like.

In the hydrogenated diene (co)polymerized rubber, a hydrogenation ratio to the diene-based (co)polymer before hydrogenation is preferably in a range from 10% to 95%, more preferably from 20% to 70%, and further preferably from 30% to 65%.

A weight average molecular weight (Mw) of the hydrogenated diene-based (co)polymerized rubber is preferably in a range from 10,000 to 1,000,000, more preferably from 30,000 to 800,000, and further preferably from 50,000 to 500,000.

The silicone rubber is preferably a polyorganosiloxane-based polymer having a polymerizable unsaturated bond (carbon-carbon double bond), and is particularly preferably a modified polyorganosiloxane rubber obtained by condensation of one or more types of the organosiloxane (i) having the following structural unit represented by the general formula (1) and a graft crossing agent (ii):

$$[R^1{}_n SiO]_{(4-n)/2} \tag{1}$$

(wherein $R^1$ is a substituted or unsubstituted monovalent hydrocarbon group, and n represents an integer of 0 to 3. When the number of $R^1$ is plural, they may be identical or different).

Examples of $R^1$ in the general formula (1), more specifically, the monovalent hydrocarbon group include an alkyl group such as methyl group, ethyl group, propyl group and butyl group; an aryl group such as phenyl group and tolyl group; an alkenyl group such as vinyl group and allyl group; a group wherein some hydrogen atoms bonded to the carbon atoms in these groups are substituted with, for example, a halogen atom or a cyano group; a group wherein at least one of the hydrogen atoms in an alkyl group is substituted with a mercapto group; and the like.

The organosiloxane (i) is linear, branched, or cyclic, and preferably has a cyclic structure. Specific example thereof includes hexamethyl cyclotrisiloxane, octamethyl cyclotetrasiloxane, decamethyl cyclopentasiloxane, dodecamethyl cyclohexasiloxane, trimethyltriphenyl cyclotrisiloxane, tetramethyltetraphenyl cyclotetrasiloxane, octaphenyl cyclotetrasiloxane and the like. These compounds may be used singly or in combination of two or more types thereof.

The organosiloxane (i) may be a polyorganosiloxane having a weight average molecular weight (Mw) of, for example, about 500 to 10,000, which is previously condensed using one or more types of the compound represented by the general formula (1). In the polyorganosiloxane, the terminal of the molecular chain may be blocked by a functional group such as hydroxyl group, alkoxy group, trimethylsilyl group and methyldiphenylsilyl group.

Examples of the graft crossing agent (ii) include a compound having a carbon-carbon unsaturated bond and an alkoxysilyl group, such as vinylmethyldimethoxysilane, p-vinylphenylmethyldimethoxysilane, 1-(p-vinylphenyl)methyldimethylisopropoxysilane, 2-(p-vinylphenyl)ethylenemethyldimethoxysilane, 3-(p-vinylphenoxy)propylmethyldiethoxysilane, 1-(o-vinylphenyl)-1,1,2-trimethyl-2,2-dimethoxydisilane, allylmethyldimethoxysilane, and γ-methacryloxypropylmethyldimethoxysilane; a silane compound having a mercapto group (thiol group) such as γ-mercaptopropylmethylmethyldimethoxysilane; a silane compound having an amino group; tetravinyl tetramethylcyclosiloxane, and the like.

When the organosiloxane (i) contains a polymerizable unsaturated bond, the graft crossing agent (ii) to be used may or may not have a polymerizable unsaturated bond.

When the modified polyorganosiloxane rubber is produced, a method may be applied in which the organosiloxane (i) and the graft crossing agent (ii) are mixed under shearing in the presence of an emulsifying agent such as alkylbenzenesulfonic acid, using a homomixer or the like, and condensed. An upper limit of the graft crossing agent (ii) to be used is preferably 50% by mass, more preferably 10% by mass, and further preferably 5% by mass based on 100% by mass of a total amount with the organosiloxane (i).

In the production of the modified polyorganosiloxane rubber, a crosslinking agent may be added for the purpose of improving impact resistance. Examples of the crosslinking agent include a trifunctional crosslinking agent such as methyltrimethoxysilane, phenyltrimethoxysilane and ethyltriethoxysilane; a tetrafunctional crosslinking agent such as tetraethoxysilane; and the like. When the crosslinking agent is used, an upper limit of the usage is usually 10 parts by mass and preferably 5 parts by mass based on 100 parts by mass of a total amount of the organosiloxane (i) and the graft crossing agent (ii).

A weight average molecular weight (Mw) of the modified polyorganosiloxane rubber is preferably in a range from 30,000 to 1,000,000.

On the other hand, the vinyl-based resin part is derived from a vinyl-based resin containing the structural unit derived from a vinyl-based monomer. The vinyl-based resin part may contain only one type of the structural unit derived from a vinyl-based monomer, or two or more types of the structural unit derived from a vinyl-based monomer.

Examples of the vinyl-based monomer include an aromatic vinyl compound, a cyanidated vinyl compound, a (meth)acrylic acid ester compound, a maleimide-based compound, an unsaturated acid anhydride, a carboxyl group containing unsaturated compound, an amino group containing unsaturated compound, an amide group containing unsaturated compound, a hydroxyl group containing unsaturated compound, an epoxy group containing unsaturated compound, an oxazoline group containing unsaturated compound, and the like. These compounds may be used singly or in combination of two or more types thereof.

In the present invention, the vinyl-based resin part preferably contains a structural unit derived from the aromatic vinyl compound from viewpoints of molding appearance and dimensional stability in the electromagnetic wave transmitable resin component (I) of the present invention. A lower limit of the content of the structural unit derived from the aromatic vinyl compound in the vinyl-based resin part is preferably 50% by mass, more preferably 60% by mass, and further preferably 70% by mass, from the above-described viewpoints.

The aromatic vinyl compound is not particularly limited as long as it has at least one vinyl bond and at least one aromatic ring. It has no substituent such as a functional group. Examples thereof include styrene, α-methyl styrene, o-methyl styrene, p-methyl styrene, β-methyl styrene, ethyl styrene, p-tert-butyl styrene, vinyl toluene, vinyl xylene, vinyl naphthalene, and the like. These compounds may be used singly or in combination of two or more types thereof. Among these, styrene and α-methyl styrene are preferable and styrene is particularly preferred.

Examples of the cyanidated vinyl compound include acrylonitrile, methacrylonitrile, ethacrylonitrile, α-ethylacrylonitrile, α-isopropylacrylonitrile and the like. These compounds may be used singly or in combination of two or more types thereof. Among these, acrylonitrile is preferred.

Examples of the (meth)acrylic acid ester compound include methyl (meth)acrylate, ethyl (meth)acrylate, n-propyl (meth)acrylate, isopropyl (meth)acrylate, n-butyl (meth) acrylate, isobutyl (meth)acrylate, sec-butyl (meth)acrylate, tert-butyl (meth)acrylate, hexyl (meth)acrylate, n-octyl (meth)acrylate, 2-ethylhexyl (meth)acrylate, cyclohexyl (meth)acrylate, phenyl (meth)acrylate, benzyl (meth)acrylate and the like. These compounds may be used singly or in combination of two or more types thereof.

Examples of the maleimide-based compound include maleimide, N-methyl maleimide, N-isopropyl maleimide, N-butyl maleimide, N-dodecyl maleimide, N-phenyl maleimide, N-(2-methylphenyl)maleimide, N-(4-methylphenyl) maleimide, N-(2,6-dimethylphenyl) maleimide, N-(2,6-diethylphenyl) maleimide, N-(2-methoxyphenyl) maleimide, N-benzyl maleimide, N-(4-hydroxyphenyl)maleimide, N-naphthyl maleimide, N-cyclohexyl maleimide and the like. Among these, N-phenyl maleimide is preferred. These compounds may be used singly or in combination of two or more types thereof. A method for introducing a structural unit deriving from the maleimide-based compound into the polymer chain includes an imidization after copolymerization with maleic anhydride.

Examples of the unsaturated acid anhydride include maleic anhydride, itaconic anhydride, citraconic anhydride, 2,3-dimethyl maleic anhydride and the like. These compounds may be used singly or in combination of two or more types thereof.

Examples of the carboxyl group containing unsaturated compound include (meth)acrylic acid, ethacrylic acid, maleic acid, fumaric acid, itaconic acid, crotonic acid, cinnamic acid and the like. These compounds may be used singly or in combination of two or more types thereof.

Examples of the amino group containing unsaturated compound include aminoethyl acrylate, propylaminoethyl acrylate, dimethylaminomethyl acrylate, diethylaminomethyl acrylate, 2-dimethylaminoethyl acrylate, aminoethyl methacrylate, propylaminoethyl methacrylate, dimethylaminomethyl methacrylate, diethylaminomethyl methacrylate, 2-dimethylaminoethyl methacrylate, phenylaminoethyl methacrylate, p-aminostyrene, N-vinyl diethylamine, N-acetyl vinyl amine, acrylamine, methacrylamine, N-methyl acrylamine and the like. These compounds may be used singly or in combination of two or more types thereof.

Examples of the amide group containing unsaturated compound include acrylamide, N-methylacrylamide, methacrylamide, N-methylmethacrylamide and the like. These compounds may be used singly or in combination of two or more types thereof.

Examples of the hydroxyl group containing unsaturated compound include a (meth)acrylic acid ester having a hydroxyl group such as hydroxymethyl (meth)acrylate, 2-hydroxyethyl (meth)acrylate, 2-hydroxypropyl (meth) acrylate, 3-hydroxypropyl (meth)acrylate, 2-hydroxybutyl (meth)acrylate, 3-hydroxybutyl (meth)acrylate, 4-hydroxybutyl (meth)acrylate, polyethyleneglycol mono(meth)acrylate and polypropyleneglycol mono(meth)acrylate; o-hydroxy styrene, m-hydroxy styrene, p-hydroxy styrene, o-hydroxy-α-methylstyrene, m-hydroxy-α-methylstyrene, p-hydroxy-α-methylstyrene, 2-hydroxymethyl-α-methylstyrene, 3-hydroxymethyl-α-methylstyrene, 4-hydroxymethyl-α-methylstyrene, 4-hydroxymethyl-1-vinyl naphthalene, 7-hydroxymethyl-1-vinyl naphthalene, 8-hydroxymethyl-1-vinyl naphthalene, 4-hydroxymethyl-1-isopropenyl naphthalene, 7-hydroxymethyl-1-isopropenyl naphthalene, 8-hydroxymethyl-1-isopropenyl naphthalene, p-vinylbenzyl alcohol, 3-hydroxy-1-propene, 4-hydroxy-1-butene, cis-4-hydroxy-2-butene, trans-4-hydroxy-2-butene, 3-hydroxy-2-methyl-1-propene, and the like. These compounds may be used singly or in combination of two or more types thereof.

Examples of the epoxy group containing unsaturated compound include glycidyl (meth)acrylate, 3,4-oxycyclohexyl (meth)acrylate, vinyl glycidyl ether, allyl glycidyl ether, methallyl glycidyl ether, monoglycidyl maleate, diglycidyl maleate, monoglycidyl itaconate, diglycidyl itaconate, monoglycidyl allylsuccinate, diglycidyl allylsuccinate, glycidyl p-styrene carboxylate, 2-methylpropenyl glycidyl ether, styrene-p-glycidyl ether and the like. These compounds may be used singly or in combination of two or more types thereof.

Examples of the oxazoline group containing unsaturated compound include vinyl oxazoline, 4-methyl-2-vinyl-2-oxazoline, 5-methyl-2-vinyl-2-oxazoline, 2-vinyl-4,4-dimethyl-2-oxazoline, 2-isopropenyl-2-oxazoline, 4-methyl-2-isopropenyl-2-oxazoline, 5-methyl-2-isopropenyl-2-oxazoline, 2-isopropenyl-4,4-dimethyl-2-oxazoline and the like.

When the vinyl-based resin part contains the structural unit derived from the aromatic vinyl compound, the vinyl-based resin part may be a vinyl-based resin part including one type or two or more types of the structural unit derived from an aromatic vinyl compound, or a vinyl-based copolymer part composed of the structural unit derived from an aromatic vinyl compound and other structural unit derived from a vinyl-based monomer. In the latter case, the other vinyl-based monomer is preferably a cyanidated vinyl compound or a (meth)acrylate compound, from viewpoint of molding appearance and others in the electromagnetic wave transmitable resin component (I) of the present invention.

In the present invention, when the vinyl-based resin part contains a structural unit derived from the aromatic vinyl compound and a structural unit derived from the cyanidated vinyl compound, a ratio of a total amount of these structural units is preferably in a range from 70% to 100% by mass, more preferably from 80% to 100% by mass, and further preferably from 85% to 100% by mass with reference to a total amount of the vinyl-based resin part, from viewpoints of molding appearance, dimensional stability, chemical resistance, and others in the electromagnetic wave transmitable resin component (I) of the present invention. The content ratios of the structural unit derived from an aromatic vinyl compound and the structural unit derived from a cyanidated vinyl compound are preferably 55% to 95% by mass and 5% to 45% by mass, more preferably 60% to 92% by mass and 8% to 40% by mass, further preferably 65% to 92% by mass and 8% to 35% by mass, furthermore preferably 70% to 88% by mass and 12% to 30% by mass, and particularly 73% to 84% by mass and 16% to 27% by mass, respectively, when a total amount of these structural units is 100% by mass, from the above-described viewpoints.

The content ratios of the rubbery polymer part and the vinyl-based resin part included in the rubbery polymer-reinforced vinyl-based resin are preferably 40% to 85% by mass and 15% to 60% by mass, more preferably 50% to 80% by mass and 20% to 50% by mass, further preferably 55% to 75% by mass and 25% to 45% by mass, and particularly 60% to 75% by mass and 25% to 40% by mass, respectively, when a total of these parts is 100% by mass, from viewpoints of mechanical characteristic and molding appearance in the electromagnetic wave transmitable resin component (I) of the present invention.

A graft rate in the rubbery polymer-reinforced vinyl-based resin, which is a graft resin, is preferably 20% or more, more preferably 30% or more, and further preferably 40% or more, from viewpoints of mechanical characteristic and molding appearance.

The graft rate can be determined by the following formula:

$$\text{Graft rate (\%)} = \{(S-T)/T\} \times 100 \qquad (2)$$

In the formula, S is a mass (g) of the rubbery polymer-reinforced vinyl-based resin, T is a mass (g) of the rubbery polymer contained in S gram of the rubbery polymer-reinforced vinyl-based resin. The mass of the rubbery polymer can be obtained by a method of calculating from a polymerization formula or polymerization conversion in the production of the rubbery polymer-reinforced vinyl-based resin, a method using an infrared ray absorption spectrum (IR), or the like.

Examples of the rubbery polymer-reinforced vinyl-based resin include a rubbery polymer-reinforced vinyl-based resin (diene-based rubbery polymer-reinforced vinyl-based resin) having a polymer part derived from a diene-based rubber and a vinyl-based resin part, a rubbery polymer-reinforced vinyl-based resin (acrylic rubbery polymer-reinforced vinyl-based resin) having a polymer part derived from an acrylic rubber and a vinyl-based resin part, a rubbery polymer-reinforced vinyl-based resin (ethylene α-olefin-based rubbery polymer-reinforced vinyl-based resin) having a polymer part derived from an ethylene α-olefin-based rubber and a vinyl-based resin part, a rubbery polymer-reinforced vinyl-based resin (hydrogenated diene-based rubbery polymer-reinforced vinyl-based resin) having a polymer part derived from a hydrogenated diene-based rubber and a vinyl-based resin part, and a rubbery polymer-reinforced vinyl-based resin (silicone rubbery polymer-reinforced vinyl-based resin) having a polymer part derived from silicone rubber and a vinyl-based resin part. These rubbery polymer-reinforced vinyl-based resins may be used singly or in combination of two or more types thereof. The first thermoplastic resin composition may contain only one rubbery polymer-reinforced vinyl-based resin, or two or more rubbery polymer-reinforced vinyl-based resins.

The rubbery polymer-reinforced vinyl-based resin can be obtained, as described above, by polymerizing a vinyl-based monomer in the presence of a rubbery polymer. Emulsion polymerization, suspension polymerization, solution polymerization, bulk polymerization, or combination of any of these polymerization methods may be used.

These methods usually lead to a rubber-reinforced resin containing a (co)polymer resin including a rubbery polymer-reinforced vinyl-based resin (graft resin) and a vinyl (co)polymer that contains a structural unit derived from a vinyl-based monomer and that is not chemically bonded to the rubbery polymer used as a raw material. The latter vinyl (co)polymer resin is corresponding to other thermoplastic resin.

When the first thermoplastic resin contains a rubbery polymer-reinforced vinyl-based resin, a content ratio of the rubbery polymer part to the whole of the first thermoplastic resin composition is preferably in a range from 5% to 30% by mass, more preferably from 7% to 20% by mass, and further preferably from 9% to 17% by mass, from viewpoints of mechanical characteristic and appearance in the electromagnetic wave transmitable resin component (I) of the present invention.

When the rubbery polymer-reinforced vinyl-based resin is an ethylene α-olefin-based rubbery polymer-reinforced vinyl-based resin, a content ratio thereof is preferably in a range from 3% to 80% by mass, more preferably from 5% to 50%, and further preferably from 7% to 35%, with reference to the whole of the first thermoplastic resin composition.

The polyolefin resin is preferably an unmodified (co)polymer composed of at least one structural unit derived from an α-olefin having 2 or more carbon atoms. In the present invention, the particularly preferred polyolefin resin is a resin composed of at least one structural unit derived from an α-olefin having 2-10 carbon atoms.

Examples of the α-olefin include ethylene, propylene, butene-1, pentene-1, hexene-1, 3-methylbutene-1, 4-methylpentene-1, 3-methylhexene-1 and the like. These compounds may be used singly or in combination of two or more types thereof. Among these, ethylene, propylene, butene-1, 3-methylbutene-1 and 4-methylpentene-1 are preferable and propylene is particularly preferred.

Examples of the polyolefin resin composed solely of a structural unit derived from α-olefin include polyethylene, polypropylene, an ethylene propylene copolymer, polybutene-1, ethylene butene-1 copolymer, and the like. Among these, polyethylene, polypropylene and an ethylene propylene copolymer are preferable. From viewpoints of mechanical characteristic, molding appearance and electromagnetic wave transmission, a polypropylene resin containing propylene units in an amount of 85% by mass with reference to the whole structural unit, more specifically, polypropylene and an ethylene propylene copolymer are more preferred. Examples of the ethylene propylene copolymer include a random copolymer and a block copolymer, and a random copolymer is particularly preferred.

The polyolefin resin may be crystalline or noncrystalline. The polyolefin resin preferably has a degree of crystallinity of 20% or more as measured by X-ray diffraction at room temperature.

The Tm of the polyolefin resin is preferably 40° C. or higher.

A molecular weight of the polyolefin resin is not particularly limited, but is preferably in a range from 0.01 to 500 g/10 minutes, and more preferably from 0.05 to 100 g/10 minutes in terms of a melt mass flow rate (hereinafter, referred to as "MFR") in accordance with JIS K 7210 from viewpoints of mechanical characteristic and molding appearance, and the resin having a molecular weight corresponding to these values are preferred.

In the present invention, the preferred embodiment of the first thermoplastic resin containing a polyolefin resin is a combination of the polyolefin resin and the rubbery polymer-reinforced vinyl-based resin.

The first thermoplastic resin composition may contain only one polyolefin resin, or two or more polyolefin resins.

The polycarbonate resin is not particularly limited as long as it is a resin having a carbonate bond in the main chain. The polycarbonate resin may be an aromatic polycarbonate, or an aliphatic polycarbonate. In the present invention, an aromatic polycarbonate is preferred from viewpoints of heat resistance, impact resistance, and others. This polycarbonate resin may be one whose terminate is modified by an R—CO— group or an R'—O—CO— group (each of R and R' represents an organic group).

Examples of the aromatic polycarbonate include a resin obtained by interesterification (interesterification reaction) of an aromatic dihydroxy compound and a carbonate diester through melting; a resin obtained by interfacial polycondensation using phosgene; a resin obtained by pyridine method using a reaction product between pyridine and phosgene; and the like.

The aromatic dihydroxy compound is a compound having two or more hydroxyl groups in the molecule. Examples of the aromatic dihydroxy compound include a dihydroxybenzene such as hydroquinone and resorcinol; 4,4'-biphenol, 2,2-bis(4-hydroxyphenyl)propane (hereinafter, referred to as "bisphenol A"), 2,2-bis(3,5-dibromo-4-hydroxyphenyl)propane, 2,2-bis(4-hydroxyphenyl-3-methylphenyl) propane, 2,2-bis(3-tert-butyl-4-hydroxyphenyl)propane, 2,2-bis(3,5-dimethyl-4-hydroxyphenyl)propane, bis(4-hydroxyphenyl) methane, 1,1-bis(p-hydroxyphenyl)ethane, 2,2-bis(p-hydroxyphenyl)butane, 2,2-bis(p-hydroxyphenyl)pentane, 1,1-bis(p-hydroxyphenyl)cyclohexane, 1,1-bis(p-hydroxyphenyl)-4-isopropylcyclohexane, 1,1-bis(p-hydroxyphenyl)-3,3,5-trimethylcyclohexane, 1,1-bis(p-hydroxyphenyl)-1-phenyl ethane, 9,9-bis(p-hydroxyphenyl) fluorene, 9,9-bis(p-hydroxy-3-methylphenyl)fluorene, 4,4'-(p-phenylene diisopropylidene)bisphenol, 4,4'-(m-phenylenediisopropylidene)bisphenol, bis(p-hydroxyphenyl)oxide, bis(p-hydroxyphenyl)ketone, bis(p-hydroxyphenyl) ether, bis(p-hydroxyphenyl) ester, bis(p-hydroxyphenyl) sulfide, bis(p-hydroxy-3-methylphenyl) sulfide, bis(p-hydroxyphenyl) sulfone, bis(3,5-dibromo-4-hydroxyphenyl) sulfone, bis(p-hydroxyphenyl) sulfoxide, and the like. These compounds may be used singly or in combination of two or more types thereof.

The aromatic hydroxy compound is preferably a compound having a hydrocarbon group between two benzene rings. In this compound, the hydrocarbon group may be a halogen-substituted hydrocarbon group. Additionally, a hydrogen atom in the benzene ring may be replaced with a halogen atom. Accordingly, examples of the compound include bisphenol A, 2,2-bis(3,5-dibromo-4-hydroxyphenyl) propane, 2,2-bis(4-hydroxyphenyl-3-methylphenyl)propane, 2,2-bis(3-tert-butyl-4-hydroxyphenyl)propane, 2,2-bis(3,5-dimethyl-4-hydroxyphenyl)propane, bis(4-hydroxyphenyl)methane, 1,1-bis(p-hydroxyphenyl)ethane, 2,2-bis(p-hydroxyphenyl)butane, and the like. Among these, bisphenol A is particularly preferred.

Examples of the carbonate diester used for obtaining an aromatic polycarbonate by interesterification reaction include dimethyl carbonate, diethyl carbonate, di-tert-butyl carbonate, diphenyl carbonate, ditolyl carbonate, and the like. These compounds may be used singly or in combination of two or more types thereof.

An average molecular weight and molecular weight distribution of the polycarbonate resin are not particularly limited. A molecular weight of the polycarbonate resin is preferably in a range from 10,000 to 50,000, more preferably from 15,000 to 30,000, and further preferably from 17,500 to 27,000 in terms of the viscosity-average molecular weight (Mv) converted from the solution viscosity measured at 25° C. using methylene chloride as a solvent. When the viscosity-average molecular weight is in a range from 10,000 to 50,000, marked impact resistance and others are achieved.

A MFR of the polycarbonate resin at a temperature of 240° C. and under a load of 10 kg is preferably in a range from 1 to 70 g/10 minutes, more preferably from 2.5 to 50 g/10 minutes preferably from 4 to 30 g/10 minutes.

In the present invention, the preferred embodiment of the first thermoplastic resin containing a polycarbonate resin is a combination of a polycarbonate resin and a rubbery polymer-reinforced vinyl-based resin, or a combination of a polycarbonate resin, a rubbery polymer-reinforced vinyl-based resin, and a vinyl-based (co)polymer ((co)polymer resin). When the polycarbonate resin is contained, heat resistance is further improved.

The polycarbonate resin included in the first thermoplastic resin composition may be only one type, or two or more types thereof.

The first thermoplastic resin may contain any one of the rubbery polymer-reinforced vinyl-based resin, polyolefin resin and polycarbonate resin, or two or all of these resins.

The first thermoplastic resin composition according to the present invention may contain other thermoplastic resin. Examples of the other thermoplastic resin include a modified polyolefin resin, a resin obtained by hydrogenation of a copolymer containing a structural unit derived from an aromatic vinyl compound and a structural unit derived from a conjugated diene-based compound (hereinafter, referred to as "hydrogenated styrene diene-based resin"), a styrene diene-based resin, a polycarbonate resin, a polyamide resin, a polyester resin, a polyvinyl chloride resin, a polyvinylidene chloride resin, a fluorocarbon resin, a (co)polymer resin (excluding the rubbery polymer-reinforced vinyl-based resin) obtained using at least one of an aromatic vinyl compound, a cyanidated vinyl compound, a (meth)acrylic acid ester compound, a maleimide-based compound, an unsaturated acid anhydride, a carboxyl group containing unsaturated compound, an amino group containing unsaturated compound, an amide group containing unsaturated compound, a hydroxyl group containing unsaturated compound and an oxazoline group containing unsaturated compound, and the like. Other thermoplastic resin may be used singly or in combination of two or more types thereof. When the first thermoplastic resin contains other thermoplastic resin, an upper limit of the content ratio is preferably 90% by mass, and more preferably 80% by mass. Some of the modified polyolefin resins and hydrogenated styrene-diene resins improve compatibility between the rubbery polymer-reinforced vinyl-based resin and the polyolefin resin depending on the type of the rubbery polymer-reinforced vinyl-based resin.

When the first thermoplastic resin contains the rubbery polymer-reinforced vinyl-based resin and the polyolefin resin, the content ratios of these resins are preferably 30% to 95% by mass and 5% to 70% by mass, more preferably 50% to 90% by mass and 10% to 50% by mass, and further preferably 65% to 85% by mass and 15% to 35% by mass, respectively, when a total of these resins is 100% by mass, from viewpoints of electromagnetic wave transmission and appearance in the electromagnetic wave transmitable resin component (I) of the present invention.

When the rubbery polymer-reinforced vinyl-based resin and the polyolefin resin are used in combination, the first thermoplastic resin composition preferably contains a (co)polymer resin. A content ratio of a total amount of the rubbery polymer-reinforced vinyl-based resin and (co)polymer resin, and a content of the polyolefin resin contained in this composition is preferably 35% to 95% by mass and 5% to 65% by mass, more preferably 50% to 90% by mass and 10% to 50% by mass, and further preferably 65% to 85% by mass and 15% to 35% by mass, respectively, when a total of these resins is 100% by mass, from viewpoints of electromagnetic wave transmission, dimensional stability, and mechanical characteristic.

When the first thermoplastic resin composition according to the present invention mainly includes a rubbery polymer-reinforced vinyl-based resin, a polyolefin resin, and a (co)polymer resin, and further contains other thermoplastic resin, an upper limit of a content ratio thereof is preferably 30 parts by mass, and more preferably 20 parts by mass based on 100 parts by mass of a total of the rubbery polymer-reinforced vinyl-based resin, the polyolefin resin, and the (co)polymer resin.

Figure 4:
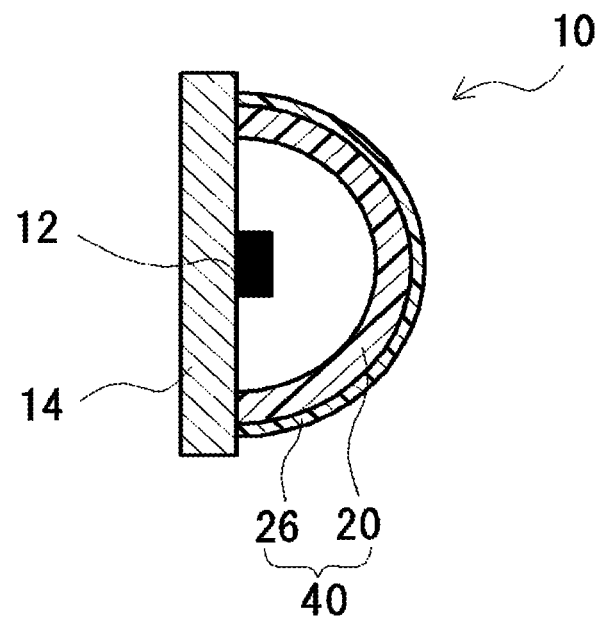
FIG. 4 is schematic cross sectional views showing another example of an electromagnetic wave transmitable resin component (I), a radome and a radar equipment including the same in the present invention.

When the first thermoplastic resin contains the rubbery polymer-reinforced vinyl-based resin and the polycarbonate resin, the content ratios of these resins are preferably 30% to 95% by mass and 5% to 70% by mass, more preferably 35% to 95% by mass and 5% to 65% by mass, further preferably 40% to 85% by mass and 15% to 60% by mass, and particularly 45% to 75% by mass and 25% to 55% by mass, respectively, when a total of these resins is 100% by mass, from viewpoints of electromagnetic wave transmission, mechanical characteristic, and heat resistance in the electromagnetic wave transmitable resin component (I) of the present invention. In this case, the rubbery polymer-reinforced vinyl-based resin is preferably an ethylene α-olefin-based rubbery polymer-reinforced vinyl-based resin. The structures of the electromagnetic wave transmitable resin component (I) and radome of the present invention are more specifically described below. In the case of a laminated type radome 40 as depicted in FIG. 4, when an electromagnetic wave transmitable resin component 20 is formed from the first thermoplastic resin composition composed mainly of an ethylene α-olefin-based rubbery polymer-reinforced vinyl-based resin and a polycarbonate resin, and other electromagnetic wave transmitable resin component 26 is formed from a thermoplastic resin composition composed mainly of a polycarbonate resin, marked adhesion is achieved between them.

The higher the content ratio of the polycarbonate resin in the electromagnetic wave transmitable resin component 20, transmission of an electromagnetic wave such as a millimeter wave is sometimes decreased, so that a content ratio of the polycarbonate resin for achieving sufficient transmission is preferably in a range from 5% to 45% by mass, more preferably from 7% to 35% by mass, and further preferably from 8% to 25% by mass.

A content ratio of the polycarbonate resin for improving heat resistance is preferably in a range from 20% to 70% by mass, more preferably from 30% to 65% by mass, and further preferably from 40% to 65% by mass.

When the first thermoplastic resin composition includes mainly an ethylene α-olefin-based rubbery polymer-reinforced vinyl-based resin and contains other thermoplastic resin except a polycarbonate resin, an upper limit of a content ratio of the other thermoplastic resin is preferably 2,500 parts by mass and more preferably 2,000 parts by mass based on 100 parts by mass of the ethylene α-olefin-based rubbery polymer-reinforced vinyl-based resin. In this case, other thermoplastic resin is preferably the (co)polymer resin.

When the first thermoplastic resin composition contains an ethylene α-olefin-based rubbery polymer-reinforced vinyl-based resin and the (co)polymer resin, a content ratio of the (co)polymer resin is preferably in a range from from 200 to 1,800 parts by mass, more preferably from 220 to 1,200 parts by mass, and further preferably from 250 to 1,000 parts by mass based on 100 parts by mass of the ethylene α-olefin-based rubbery polymer-reinforced vinyl-based resin, from viewpoints of further improvement in molding processability and molding appearance.

The first thermoplastic resin composition according to the present invention may contain, as described above, an additive. Examples of the additive include a filler which prevents the decrease of the dielectric constant of the electromagnetic wave transmitable resin component (I) or improves mechanical characteristic, a plasticizer, an antioxidant, an ultraviolet absorber, an antiaging agent, a flame retardant, a stabilizer, a weathering agent, a light stabilizer, a heat stabilizer, an antistatic agent, a water repellent, an oleum repellent, an anti-foaming agent, an antibacterial agent, an antiseptic, a coloring agent (for example, a pigment and a dye), and the like.

The first thermoplastic resin composition according to the present invention preferably contains a filler. The filler may be inorganic filler or organic filler, but is preferably an inorganic filler.

A material of the inorganic filler, shape, and the like are not particularly limited.

Examples of the constituent material of the inorganic filler include talc, calcium carbonate, magnesium carbonate, mica, kaolin, calcium sulfate, barium sulfate, alumina, titanium oxide, silica, carbonblack, aluminum hydroxide, magnesium hydroxide, glass, wollastonite, carbon, silicon carbide, zinc oxide, aluminum borate, basic magnesium sulfate, and the like.

The inorganic filler may be a particle composed of a solid body, a hollow body, or a tubular body having a shape of spherical, oval spherical, plate-shaped (flake), polyhedron, or linear (for example, whisker).

The inorganic filler may be used singly or in combination of two or more types thereof. Among these, a talc particle, carbonblack, and an alumina particle are preferred from viewpoints of transmission of an electromagnetic wave such as a millimeter wave and mechanical characteristic in the electromagnetic wave transmitable resin component (I) of the present invention.

The talc particle is not particularly limited in terms of whiteness, apparent density, specific surface area, and the like, and preferably has a specific size from viewpoints of transmission of an electromagnetic wave such as a millimeter wave, appearance, and mechanical characteristic in the electromagnetic wave transmitable resin component (I) of the present invention. An average particle size (median diameter) as measured by a laser diffraction method is preferably 20 μm or smaller, more preferably 15 μm or smaller, and further preferably in a range from 1 to 10 μm.

Carbonblack is not particularly limited in terms of specific surface area, ash content, and the like, and preferably has a specific size, from viewpoints of transmission of an electromagnetic wave such as a millimeter wave, appearance, mechanical characteristic, and the like in the electromagnetic wave transmitable resin component (I) of the present invention. An average particle size as measured by, for example, observation with an electron microscope is preferably in a range from 10 to 70 nm, and more preferably from 20 to 50 nm.

The alumina particle is not particularly limited in terms of specific surface area and types of impurity elements, and is preferably a spherical particle having a specific size, from viewpoints of transmission of an electromagnetic wave such as a millimeter wave, appearance, mechanical characteristic, and the like in the electromagnetic wave transmitable resin component (I) of the present invention. An average particle size as measured by, for example, observation with an electron microscope is preferably in a range from 5 to 80 μm, and more preferably from 5 to 30 μm.

A content ratio of the inorganic filler contained in the first thermoplastic resin composition is in a range from 0.1 to 40 parts by mass, preferably from 0.3 to 30 parts by mass, and more preferably from 0.5 to 20 parts by mass based on 100 parts by mass of a content of the first thermoplastic resin, from viewpoints of transmission of an electromagnetic wave such as a millimeter wave, appearance, and mechanical characteristic in the electromagnetic wave transmitable resin component (I) of the present invention.

When the inorganic filler contains a talc particle or an alumina particle, a content ratio thereof is preferably in a range from 0.5 to 40 parts by mass, more preferably from 1 to 30 parts by mass, and further preferably from 3 to 20 parts by mass based on 100 parts by mass of a content of the first thermoplastic resin.

When the inorganic filler contains carbonblack, a content ratio thereof is preferably in a range from 0.1 to 10 parts by mass, more preferably from 0.2 to 5 parts by mass, and further preferably from 0.3 to 3 parts by mass based on 100 parts by mass of a content of the first thermoplastic resin.

The inorganic filler may be of a combination of a talc particle or an alumina particle with carbonblack. In this case, the content ratios of the talc particle or alumina particle and carbonblack are preferably 0.3 to 30 parts by mass and 0.1 to 10 parts by mass, more preferably 0.5 to 20 parts by mass and 0.2 to 5 parts by mass, and further preferably 2 to 15 parts by mass and 0.3 to 3 parts by mass, respectively, based on 100 parts by mass of a content of the first thermoplastic resin.

Alternatively, carbonblack may be combined with other inorganic filler excluding talc particle and alumina particle. In this case, the content ratios of carbonblack and other inorganic filler are preferably 0.1 to 10 parts by mass and 0.1 to 30 parts by mass, more preferably 0.2 to 5 parts by mass and 0.2 to 20 parts by mass, and further preferably 0.3 to 3 parts by mass and 0.5 to 15 parts by mass, respectively, based on 100 parts by mass of a content of the first thermoplastic resin.

The physical properties of the electromagnetic wave transmitable resin component (I) of the present invention are as described below.

According to the first thermoplastic resin composition, a dielectric loss tangent at a frequency of about 77 GHz is preferably $10.0 \times 10^{-2}$ or less. A dielectric constant is preferably 2.8 or less, more preferably 2.7 or less, further preferably 2.6 or less, and particularly 2.5 or less. In order to reduce an attenuation amount of the electromagnetic wave transmitting through the resin component, the value of the dielectric loss tangent is preferably smaller. In order to reduce the amount of the electromagnetic wave reflected on the resin component surface, the value of the dielectric constant is preferably smaller.

A shrinkage rate measured in accordance with JIS K 7152-4 is 1.2% or less, preferably 1.0% or less, and more preferably 0.9% or less.

According to the first thermoplastic resin composition wherein the first thermoplastic resin includes mainly a rubbery polymer-reinforced vinyl-based resin, the dielectric loss tangent at a frequency of about 77 GHz is preferably $9.0 \times 10^3$ or less, more preferably $8.7 \times 10^3$ or less, further preferably $8.5 \times 10^{-3}$ or less, and particularly $8.3 \times 10^{-3}$ or less.

The electromagnetic wave transmitable resin component (I) of the present invention may be obtained by melting the first thermoplastic resin composition or the mixture of the raw material components, and then subjecting the molten material to a publicly known molding method such as injection molding. In the present invention, the first thermoplastic resin and additive may be commercial products. For example, examples of the commercial product of talc particles include "MICRO ACE SG Series" (trade name) manufactured by Nippon Talc Co., Ltd., and the like. Examples of commercial products of carbonblack include "Mitsubishi Carbon Black #45, #33, and #260" (trade name) manufactured by Mitsubishi Chemical Corporation, "TOKA BLACK #7360SB and #7350" (trade name) manufactured by Tokai Carbon Co., Ltd., and the like. Additionally, examples of commercial products of alumina particles include "ADMAFINE AO Series" (trade name) manufactured by Admatechs Co., Ltd., and the like. When the electromagnetic wave transmitable resin component (I) or radome of the present invention contains the first thermoplastic resin and an additive, as a raw material, a master batch composed of the first thermoplastic resin and the additive may be used.

The first thermoplastic resin composition according to the present invention has marked flowability during melting, and thus has marked molding processability as a raw material when used in a known molding method. In particular, the first thermoplastic resin composition allows smooth production of the electromagnetic wave transmitable resin component (I) having no problem in its appearance, or the like.

The electromagnetic wave transmitable resin component (I) of the present invention is suitable for a radome storing an antenna module for transmitting or receiving an electromagnetic wave, or a decorative member.

The electromagnetic wave transmitable resin component 20 of the present invention can be used alone as a radome 40 depending on its shape (see FIGS. 1, 2, 5, and 6). Additionally, the electromagnetic wave transmitable resin component 20 of the present invention may combined with, for example, other resin components 22, 26 or the like to form radomes 40 (see FIGS. 3, 4, and 7).

A shape of the electromagnetic wave transmitable resin component (I) and radome of the present invention is not particularly limited. They may have, for example, a curved surface or a corner, as depicted in FIGS. 1 to 7 and may conform to the shape of, for example, an antenna module, a radar equipment or the like.

Figure 5:
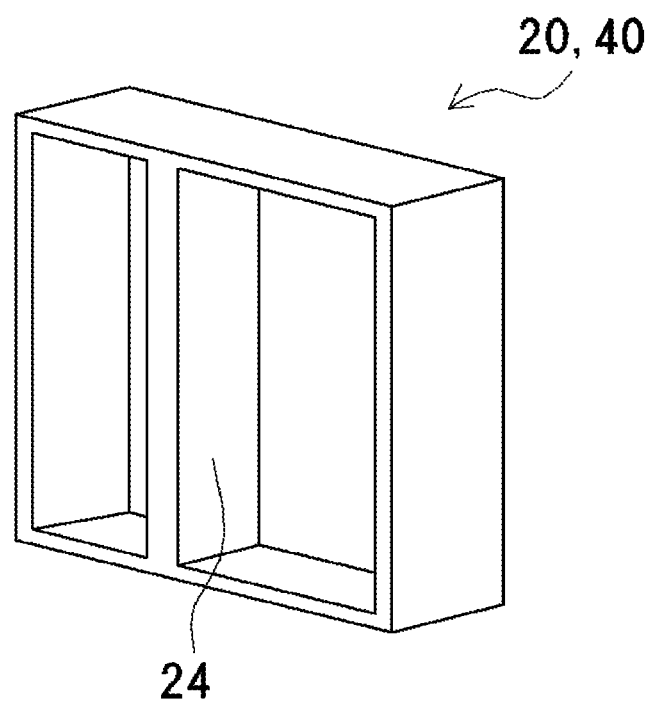
FIG. 5 is schematic cross sectional views showing another example of an electromagnetic wave transmitable resin component (I), and a radome in the present invention.
Figure 6:
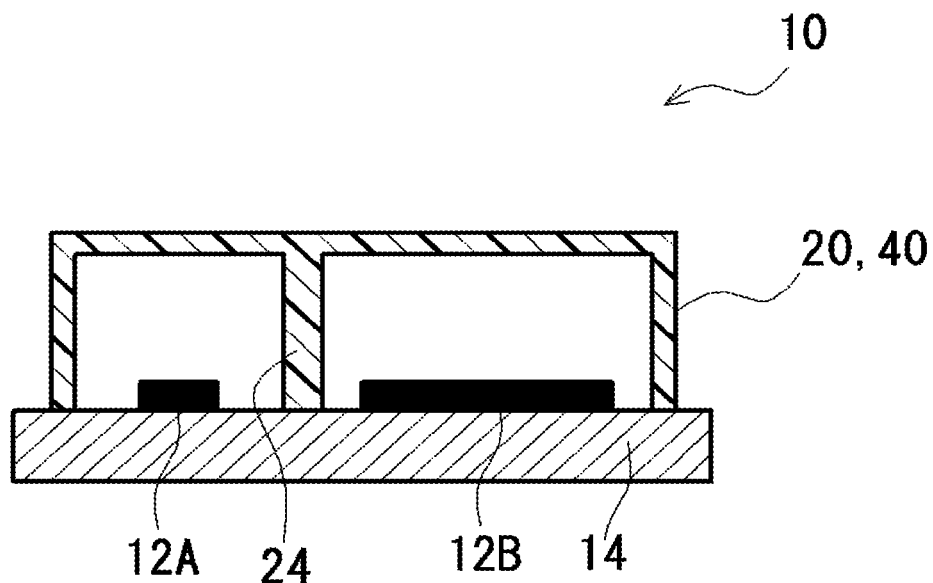
FIG. 6 is schematic cross sectional views showing another example of a radar equipment including the electromagnetic wave transmitable resin component (I) or a radome in FIG. 5.

FIGS. 1, 2, 3, 4 and 7 depict a radar equipment wherein the antenna module 12 which can transmit and receive by itself is stored in or protected by the radome 40, and FIG. 6 depicts a radar equipment wherein two objects, for example, a transmitting antenna module 12A and a receiving antenna module 12B, are stored in or protected by the radome 40 (FIG. 5) including a partition 24 which absorbs or reflects an electromagnetic wave such as a millimeter wave. The antenna modules 12, 12A, and 12B may be arranged on, for example, an antenna base 14 made of a resin or an inorganic material (for example, metal or ceramics). The radome 40 may be arranged on the antenna base 14 directly or via other member. Additionally, the antenna base 14 is a flat plate in FIGS. 1, 2, 3, 4, 6 and 7, but the shape is not limited to this. The antenna base may be a curved surface plate or has an uneven cross section or a zigzag cross section.

The radar equipments 10 in FIGS. 1 and 2 are in an embodiment which includes the radome 40 including the hemispherical electromagnetic wave transmitable resin component 20 having a uniform wall thickness over the whole, which allows transmission and reception of an electromagnetic wave such as a millimeter wave by the antenna base 14 over the whole right side of the drawing. In order to allow transmission and reception of an electromagnetic wave such as a millimeter wave from the antenna module 12 only in a specific direction, the electromagnetic wave transmitable resin component 20 may partially have a thick wall part which is too thicker or thinner than the above-described preferred length, thereby varying transmission of an electromagnetic wave having a specific wavelength such as a millimeter wave, though it is made of the same first thermoplastic resin composition.

The radar equipment 10 in FIG. 3 is in an embodiment wherein the electromagnetic wave transmitable resin component 20 and the other resin component 22 absorbing or reflecting an electromagnetic wave such as a millimeter wave are combined to make the hemispherical radome 40, and allows transmission and reception of an electromagnetic wave such as a millimeter wave in only a specific direction from the antenna module 12.

The radar equipment 10 in FIG. 4 is in an embodiment which includes the radome 40 including the electromagnetic wave transmitable resin component 20 and other electromagnetic wave transmitable resin component 26, and allows transmission and reception of an electromagnetic wave such as a millimeter wave by the antenna base 14 in the whole right side of the drawing. The other electromagnetic wave transmitable resin component 26 may include the first thermoplastic resin composition according to the present invention alone, or may include known other resin composition. In the radar equipment 10 of laminate type depicted in FIG. 4, the dielectric constant of the electromagnetic wave transmitable resin component 20 and the dielectric constant of the other electromagnetic wave transmitable resin component 26 are preferably generally same.

FIG. 5 depicts the electromagnetic wave transmitable resin component 20 in a cuboid form or the radome 40 including the first thermoplastic resin composition according to the present invention, except that the wall thickness of the partition 24 is increased so as to differ transmission of an electromagnetic wave such as a millimeter wave from the other part, and the radar equipment 10 in FIG. 6 including this is in an embodiment wherein the transmitting antenna module 12A and receiving antenna module 12B are separately stored by the partition 24. When the radar equipment 10 has this structure, sneak of an electromagnetic wave such as a millimeter from the transmitting antenna to the receiving antenna is prevented by the partition 24. FIG. 5 depicts the electromagnetic wave transmitable resin component 20 or the radome 40 which include the partition 24 which is integrated. In another embodiment, the radar equipment may include the radome 40 wherein the partition 24 is formed by a member made of a material which absorbs or reflects an electromagnetic wave such as a millimeter wave.

Figure 7:
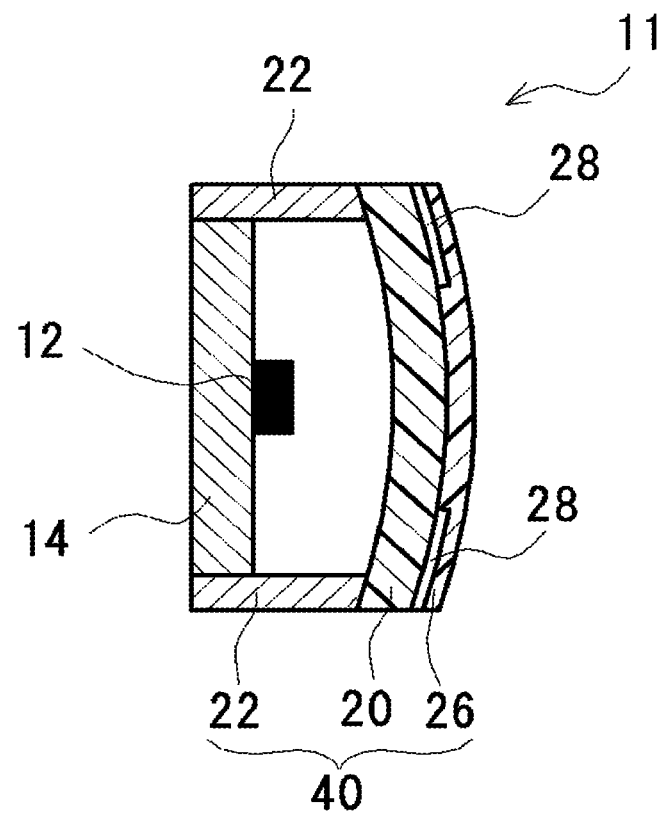
FIG. 7 is a schematic cross sectional view of a millimeter wave radar equipment as an example of the radar equipment of the present invention.

FIG. 7 is a schematic view of the millimeter wave radar equipment 11 as a component such as a sensor suitable for adaptive cruise control (A.C.C.) which is attracting attention as a core technique in intelligent transport system (ITS) aimed at moderation of traffic congestion and decrease of accidents.

The basic structure in FIG. 7 is a combination of FIGS. 3 and 4, wherein the antenna module 12 arranged on the antenna base 14 is stored in a radome including the electromagnetic wave transmitable resin component 20 for a millimeter wave, the other electromagnetic wave transmitable resin component 26 for a millimeter wave, and the other resin component 22 which absorbs or reflects a millimeter wave. Additionally, a decorative layer 28, which may transmit or may not transmit a millimeter wave and forms a design on the front side of a vehicle, is included between the millimeter wave transmission resin component 20 and other millimeter wave transmission resin component 26, whereby the design depicted by the decorative layer 28 can be recognized from the side of the other millimeter wave transmission resin component 26. The decorative layer 28 may be formed by, for example, printing, painting, or vapor deposition. When the decorative layer 28 transmits a millimeter wave, the dielectric constant of the millimeter wave transmission resin component 20 and the dielectric constant of the decorative layer 28 are preferably generally the same.

Although not depicted, the millimeter wave radar equipment is in an embodiment excluding the other millimeter wave transmission resin component 26 in FIG. 7.

In the next place, the electromagnetic wave transmitable resin component (II) in the other invention including a base resin layer and a transparent resin layer is described.

The resin material (X) constituting the base resin layer may be a thermoplastic resin composition or a cured resin composition, but is preferably a thermoplastic resin composition. The thermoplastic resin (hereinafter, referred to as "second thermoplastic resin") contained in the thermoplastic resin composition is not particularly limited. Example thereof includes a rubbery polymer-reinforced vinyl-based resin (hereinafter, may be referred to as "resin (R1)") having a polymer part derived from a rubber (hereinafter, referred to as "rubbery polymer part") and a vinyl-based resin part; a polyolefin resin (hereinafter, may be referred to as "resin (R2)"); an acrylic resin (hereinafter, may be referred to as "resin (R3)"); a polycarbonate resin (hereinafter, may be referred to as "resin (R4)"); a vinyl-based (co)polymer containing a structural unit derived from a vinyl-based monomer (such as an aromatic vinyl-based (co)polymer, a polyvinyl chloride resin, a polyvinylidene chloride resin and a fluorocarbon resin, excluding a rubbery polymer-reinforced vinyl-based resin; hereinafter, may be referred to as "resin (R5)")); a polyamide resin; a polyester resin; a resin obtained by hydrogenation of a copolymer having a structural unit derived from an aromatic vinyl compound and a structural unit derived from a conjugated diene-based compound (hereinafter, referred to as "hydrogenated styrene diene-based resin"); and the like. The second thermoplastic resin contained in the thermoplastic resin composition may be one type, or two or more types. In the present invention, the resins (R1), (R2), (R3) and (R4) are preferred. It is particularly preferred that the resin (R1) be used in combination with at least one of the resins (R2), (R4) and (R5).

The resin (R1) is preferably a graft resin wherein a rubbery polymer part and a vinyl-based resin part are chemically bonded, which is obtained by polymerizing a vinyl-based monomer in the presence of an ethylene α-olefin-based rubber or a diene-based rubber.

The ethylene α-olefin-based rubber forming the rubbery polymer part is preferably a copolymer rubber (ethylene α-olefin copolymer) consisting of a structural unit derived from ethylene and a structural unit derived from α-olefin, or a copolymer rubber (ethylene α-olefin non-conjugated diene copolymer) which further includes, in addition to these structural units, a structural unit derived from a non-conjugated diene. An amount of the ethylene unit included in the ethylene α-olefin-based rubber is in a range from 30% to 95% by mass, preferably from 30 to 85% by mass, more preferably from 40% to 80% by mass, and further preferably from 45% to 75% by mass from a viewpoint of mechanical characteristic in the electromagnetic wave transmitable resin component (II) of the present invention.

As the α-olefin, the exemplified compounds as the α-olefin used for the formation of the rubbery polymer part derived from an ethylene α-olefin-based rubber for the rubbery polymer-reinforced vinyl-based resin capable of using as the first thermoplastic resin may be used. The α-olefin may be used singly or in combination of two or more types thereof. A number of the carbon atom in the α-olefin is preferably in a range from 3 to 20, more preferably from 3 to 12, and further preferably from 3 to 8, from a viewpoint of mechanical characteristic of the electromagnetic wave transmitable resin component (II) of the present invention.

As the non-conjugated diene, the exemplified compounds as the non-conjugated diene used for the formation of the rubbery polymer part derived from an ethylene α-olefin-based rubber for the rubbery polymer-reinforced vinyl-based resin capable of using as the first thermoplastic resin may be used. The non-conjugated diene may be used singly or in combination of two or more types thereof.

When the ethylene α-olefin-based rubber is an ethylene α-olefin non-conjugated diene copolymer rubber, an upper limit of a content ratio of the structural unit derived from a non-conjugated diene is preferably 15% by mass, more preferably 10% by mass, and further preferably 5% by mass, based on 100% by mass of a total content of the structural units included in the ethylene α-olefin-based rubber.

The ethylene α-olefin-based rubber is preferably an ethylene α-olefin copolymer from a viewpoint of transmission of an electromagnetic wave such as a millimeter wave from the first surface side of the electromagnetic wave transmitable resin component (II) toward the other surface side. Among these, the ethylene α-olefin-based rubber is an ethylene α-olefin copolymer having Tm preferably from 0° C. to 120° C., more preferably from 10° C. to 100° C., and further preferably from 30° C. to 80° C. The ethylene α-olefin-based rubber is more preferably a copolymer including a structural unit derived from ethylene and a structural unit derived from α-olefin having a carbon atom number of 3 to 8. The ethylene α-olefin-based rubber is further preferably an ethylene propylene copolymer, an ethylene 1-butene copolymer and an ethylene 1-octene copolymer, and particularly an ethylene propylene copolymer.

As the diene-based rubber forming the rubbery polymer part, the exemplified polymers as the diene-based rubber used for the formation of the rubbery polymer part derived from a diene-based rubber for the rubbery polymer-reinforced vinyl-based resin capable of using as the first thermoplastic resin may be used. The diene-based rubber is preferably a polybutadiene.

On the other hand, the vinyl-based resin part contained in the resin (R1) is preferably a part derived from a vinyl-based resin containing a structural unit derived from a vinyl-based monomer. The vinyl-based resin part may only one type of the structural unit derived from a vinyl-based monomer, or two or more types of the structural unit derived from a vinyl-based monomer.

Examples of the vinyl-based monomer include an aromatic vinyl compound, a cyanidated vinyl compound, a (meth)acrylic acid ester compound, a maleimide-based compound, an unsaturated acid anhydride, a carboxyl group containing unsaturated compound, an amino group containing unsaturated compound, an amide group containing unsaturated compound, a hydroxyl group containing unsaturated compound, an epoxy group containing unsaturated compound, an oxazoline group containing unsaturated compound, and the like. These compounds may be used singly or in combination of two or more types thereof. Specific examples of these compounds are described above.

In the present invention, the vinyl-based resin part preferably contains a structural unit derived from the aromatic vinyl compound from viewpoints of mechanical strength, appearance, and the like of the electromagnetic wave transmitable resin component (II). In this case, a lower limit of a content of the structural unit derived from an aromatic vinyl compound contained in the vinyl-based resin part is preferably 50% by mass, more preferably 60% by mass, and further preferably 70% by mass, from the above-described viewpoint.

The aromatic vinyl compound is preferably styrene or α-methyl styrene, and styrene is particularly preferred.

The cyanidated vinyl compound is preferably acrylonitrile.

When the vinyl-based resin part contains a structural unit derived from the aromatic vinyl compound, the vinyl-based resin part may be a vinyl-based resin part consisting of one type or two or more types of the structural unit derived from the aromatic vinyl compound, or be a vinyl-based resin part consisting of one type or two or more types of the structural unit derived from the aromatic vinyl compound and one type or two or more types of the structural unit derived from other vinyl-based monomer. In the latter case, the other vinyl-based monomer is preferably a cyanidated vinyl compound or a (meth)acrylate compound from viewpoints of mechanical strength and the like of the electromagnetic wave transmitable resin component (II).

In the present invention, when the vinyl-based resin part contains the structural unit derived from an aromatic vinyl compound and the structural unit derived from a cyanidated vinyl compound, a ratio of a total amount of these structural units is preferably in a range from 70% to 100% by mass, more preferably from 80% to 100% by mass, and further preferably from 85% to 100% by mass with reference to a total amount of the vinyl-based resin part, from viewpoints of transmission of an electromagnetic wave such as a millimeter wave, and chemical resistance of the base resin layer from the first surface side of the electromagnetic wave transmitable resin component (II) toward the other surface side. The content ratios of the structural unit derived from an aromatic vinyl compound and the structural unit derived from a cyanidated vinyl compound are preferably 55% to 95% by mass and 5% to 45% by mass, more preferably 65% to 92% by mass and 8% to 35% by mass, further preferably 70% to 88% by mass and 12% to 30% by mass, and particularly 73% to 84% by mass and 16% to 27% by mass, respectively, when a total amount of these structural units is 100% by mass, from the above-described viewpoints.

The content ratios of the rubbery polymer part and vinyl-based resin part included in the resin (R1) are preferably 40% to 85% by mass and 15% to 60% by mass, more preferably 50% to 80% by mass and 20% to 50% by mass, and further preferably 60% to 75% by mass and 25% to 40% by mass, respectively, based on 100% by mass of a total of these parts, from viewpoints of mechanical characteristic and others in the electromagnetic wave transmitable resin component (II) of the present invention.

A graft rate of the resin (R1), which is a graft resin, is preferably 20% or more, more preferably 30% or more, and further preferably in a range from 35% to 65%, from a viewpoint of mechanical characteristic of the electromagnetic wave transmitable resin component (II). The graft rate can be determined by the formula (2).

The resin (R1) can be obtained, as described above, by polymerizing a vinyl-based monomer in the presence of an ethylene α-olefin-based rubber or a diene-based rubber. Emulsion polymerization, suspension polymerization, solution polymerization, bulk polymerization, or the like can be employed.

According to these polymerization methods, a rubber-reinforced resin can be usually obtained including the resin (R1) composed of a graft resin, and a vinyl (co)polymer having a structural unit derived from a vinyl-based monomer which is not chemically bonded to the ethylene α-olefin-based rubber or diene-based rubber used as a raw material. The latter vinyl-based (co)polymer is contained in the resin (R5).

The resin (R1) is preferably a resin consisting of a rubbery polymer part derived from the ethylene α-olefin-based rubber and a vinyl-based resin part.

The resin (R2) is usually a polyolefin resin consisting of a (co)polymer having at least one type of the structural units derived from an α-olefin having a carbon atom number of 2 or more. A content ratio of the structural unit derived from an α-olefin in the resin (R2) is preferably in a range from 70% to 100% by mass, and more preferably from 90% to 100% by mass. The resin (R2) may be unmodified or modified, but is preferably an unmodified (co)polymer containing at least one structural unit derived from the α-olefin, and particularly preferably a (co)polymer consisting of at least one structural unit derived from the α-olefin.

Examples of the polyolefin resin composed solely of the structural unit derived from the α-olefin include polyethylene, polypropylene, an ethylene propylene copolymer, polybutene-1, ethylene butene-1 copolymer, and the like. Among these, polyethylene, polypropylene and a propylene ethylene copolymer are preferable, and polypropylene-based resins containing 85% or more by mass of propylene unit with reference to the all structural units, specifically, polypropylene and an ethylene propylene copolymer are more preferable, from viewpoints of mechanical characteristic and transmission of an electromagnetic wave such as a millimeter wave. The ethylene propylene copolymer is preferably a random copolymer, a block copolymer, or the like.

When the resin (R2) is a modified polyolefin resin, as the modified polyolefin resin, the exemplified resins or copolymers as the modified polyolefin resin for the other thermoplastic resin capable of containing in the first thermoplastic resin composition may be used.

The resin (R2) may be crystalline or noncrystalline. The resin (R2) preferably has a degree of crystallinity of 20% or more as measured by X-ray diffraction at room temperature.

The Tm of the resin (R2) is preferably 40° C. or higher.

A molecular weight of the resin (R2) is not particularly limited, but is preferably in a range from 0.01 to 500 g/10 minutes, and more preferably from 0.05 to 100 g/10 minutes in terms of a melt mass flow rate (hereinafter, referred to as "MFR") in accordance with JIS K 7210 from a viewpoint of mechanical characteristic of the electromagnetic wave transmitable resin component (II), and the resin having a molecular weight corresponding to these values are preferred.

The resin (R3) is not particularly limited as long as it contains a structural unit derived from a methacrylic acid ester compound. A lower limit of a content of the structural unit is preferably 70% by mass, and more preferably 85% by mass with reference to a total content of the structural units included in the resin (R3), from a viewpoint of mechanical characteristic of the electromagnetic wave transmitable resin component (II). The methacrylic acid ester compound preferably contains methyl methacrylate, and a lower limit of a content of the structural unit derived from methyl methacrylate is preferably 80% by mass, and more preferably 90% by mass, with reference to a total content of the structural unit derived from the methacrylic acid ester compound.

When the resin (R3) is a copolymer, the other structural unit may be derived from, for example, an acrylic acid ester compound, an aromatic vinyl compound, a cyanidated vinyl compound, or the like.

A molecular weight of the resin (R3) is not particularly limited, but the weight average molecular weight by GPC is preferably in a range from 50,000 to 300,000, and more preferably from 80,000 to 250,000, from a viewpoint of mechanical characteristic of the electromagnetic wave transmitable resin component (II).

The resin (R3) can be produced by emulsion polymerization, suspension polymerization, solution polymerization, bulk polymerization, or the like.

The resin (R4) is not particularly limited as long as it is a resin having a carbonate bond in the main chain. The polycarbonate resin may be an aromatic polycarbonate, or an aliphatic polycarbonate. In the present invention, an aromatic polycarbonate is preferred from viewpoints of heat resistance, impact resistance, and others of the electromagnetic wave transmitable resin component (II). This resin (R4) may be one whose terminate is modified by an R—CO— group or an R'—O—CO— group (each of R and R' represents an organic group).

As the aromatic polycarbonate, the exemplified resins as the polycarbonate resin which can be used as the first thermoplastic resin may be used.

An average molecular weight and molecular weight distribution of the resin (R4) are not particularly limited. A molecular weight of the resin (R4) is preferably in a range from 10,000 to 50,000, more preferably from 15,000 to 30,000, and further preferably from 17,500 to 27,000 in terms of the viscosity-average molecular weight (Mv) converted from the solution viscosity measured at 25° C. using methylene chloride as a solvent. When the viscosity-average molecular weight is in a range from 10,000 to 50,000, marked impact resistance and others of the electromagnetic wave transmitable resin component (II) are achieved.

A MFR of the resin (R4) at a temperature of 240° C. and under a load of 10 kg is preferably in a range from 1 to 70 g/10 minutes, more preferably from 2.5 to 50 g/10 minutes, and further preferably from 4 to 30 g/10 minutes.

The resin (R5) is a vinyl-based (co)polymer (except the resin (R1)) containing a structural unit derived from at least one selected from a group consisting of an aromatic vinyl compound, a cyanidated vinyl compound, a (meth)acrylic acid ester compound, a maleimide-based compound, an unsaturated acid anhydride, a carboxyl group containing unsaturated compound, an amino group containing unsaturated compound, an amide group containing unsaturated compound, a hydroxyl group containing unsaturated compound and an oxazoline group containing unsaturated compound.

In the present invention, the resin (R5) is more preferably a resin containing at least one selected from a structural unit derived from an aromatic vinyl compound, a structural unit derived from a cyanidated vinyl compound, and a structural unit derived from a (meth)acrylic acid ester compound, and is particularly preferably a resin containing the structural unit derived from an aromatic vinyl compound (hereinafter, referred to as "aromatic vinyl-based resin").

The aromatic vinyl-based resin is a (co)polymer resin containing a structural unit derived from an aromatic vinyl compound in an amount of preferably 50% or more by mass, and more preferably 60% or more by mass. The aromatic vinyl-based resin is particularly preferably a copolymer resin containing at least a structural unit derived from a cyanidated vinyl compound, of the cyanidated vinyl compound and a (meth)acrylic acid ester compound, (hereinafter, referred to as "aromatic vinyl-based copolymer resin").

The aromatic vinyl-based copolymer resin is a vinyl-based copolymer containing a structural unit derived from an aromatic vinyl compound and a structural unit derived from a cyanidated vinyl compound, and is a resin consisting of a vinyl-based copolymer which may further contain other structural unit derived from other vinyl-based monomer.

As the aromatic vinyl compound forming the structural unit derived from the aromatic vinyl compound, the exemplified aromatic vinyl compounds as a vinyl-based monomer used for the formation of a vinyl-based resin part in the rubbery polymer-reinforced vinyl-based resin capable of using as the first thermoplastic resin may be used. A type of the structural unit derived from an aromatic vinyl compound in the aromatic vinyl-based copolymer resin is only one or two or more types. The aromatic vinyl compound is preferably styrene or α-methyl styrene.

A content of the structural unit derived from an aromatic vinyl compound contained in the aromatic vinyl-based copolymer resin is preferably in a range from 50% to 95% by mass, more preferably from 60% to 90% by mass, and further preferably from 65% to 85% by a mass based on 100% by mass of a total of the structural units included in the aromatic vinyl-based copolymer resin. When the base resin layer contains the vinyl-based copolymer containing 50% to 95% by mass of the structural unit derived from an aromatic vinyl compound, marked electromagnetic wave transmission and mechanical characteristic are achieved in the electromagnetic wave transmitable resin component (II).

As the cyanidated vinyl compound forming the structural unit derived from the cyanidated vinyl compound, the exemplified cyanidated vinyl compounds as a vinyl-based monomer used for the formation of a vinyl-based resin part in the rubbery polymer-reinforced vinyl-based resin capable of using as the first thermoplastic resin may be used.

A content of the structural unit derived from a cyanidated vinyl compound contained in the aromatic vinyl-based copolymer resin is preferably in a range from 5% to 50% by mass, more preferably from 10% to 40% by mass, and further preferably from 15% to 35% by mass based on 100% by mass of a total of the structural units included in the aromatic vinyl-based copolymer resin. When the base resin layer contains the vinyl-based copolymer containing 5% to 50% by mass of the content of the structural unit derived from a cyanidated vinyl compound, marked electromagnetic wave transmission and mechanical characteristic are achieved in the electromagnetic wave transmitable resin component (II).

Examples of the other vinyl-based monomer for the formation of the other structural unit include a (meth)acrylic acid ester compound, a maleimide-based compound, an unsaturated acid anhydride, a carboxyl group containing unsaturated compound, a hydroxyl group containing unsaturated compound, and the like. Among these, a (meth)acrylic acid ester compound is preferable.

When the aromatic vinyl-based copolymer resin contains other structural unit, an upper limit of the content is preferably 70% by mass, and more preferably 50% by mass based on 100% by mass of a total of the structural units included in the aromatic vinyl-based copolymer resin, more specifically, the total of a structural unit derived from the aromatic vinyl compound, a structural unit derived from the cyanidated vinyl compound, and other structural unit.

The aromatic vinyl-based copolymer resin is preferably a copolymer consisting of a structural unit derived from the aromatic vinyl compound and a structural unit derived from the cyanidated vinyl compound. The aromatic vinyl-based copolymer resin may be of a combination of a vinyl-based copolymer consisting of a structural unit derived from the aromatic vinyl compound and a structural unit derived from the cyanidated vinyl compound, and another vinyl copolymer consisting of a structural unit derived from the aromatic vinyl compound, a structural unit derived from the cyanidated vinyl compound, and other structural unit.

As described above, when the resin material (X) contains the resin (R1), it is preferred that at least one of the resins (R2), (R4), and (R5) be further contained in the resin material (X).

For example, when the resin material (X) is of a combination of the resins (R1), (R2) and (R5), the content ratios of these resins are respectively preferably 10% to 60% by mass, 10% to 50% by mass and 15% to 70% by mass, and more preferably 10% to 60% by mass, 10% to 50% by mass and 15% to 70% by mass, based on 100% by mass of a total of these resins.

When the resin material (X) is of a combination of the resins (R1), (R4) and (R5), the content ratios of these resins are respectively preferably 20% to 80% by mass, 10% to 60% by mass, and 5% to 50% by mass, based on 100% by mass, and more preferably 30% to 75% by mass, 15% to 50% by mass and 10% to 40% by mass, of a total of these resins.

The resin material (X) may include an inorganic filler. A material of the inorganic filler, shape, and the like are not particularly limited.

Examples of the constituent material of the inorganic filler include talc, calcium carbonate, magnesium carbonate, mica, kaolin, calcium sulfate, barium sulfate, alumina, titanium oxide, silica, carbonblack, aluminum hydroxide, magnesium hydroxide, glass, wollastonite, carbon, silicon carbide, zinc oxide, aluminum borate, basic magnesium sulfate, and the like.

The inorganic filler may be a particle composed of a solid body, a hollow body, or a tubular body having a shape of spherical, oval spherical, plate-shaped (flake), polyhedron, or linear (for example, whisker).

The inorganic filler may be used singly or in combination of two or more types thereof. Among these, a talc particle, carbonblack, and an alumina particle are preferred from viewpoints of transmission of an electromagnetic wave such as a millimeter wave from the first surface side toward the other surface side of the electromagnetic wave transmitable resin component (II) of the present invention, and its mechanical characteristic.

The talc particle is not particularly limited in terms of whiteness, apparent density, specific surface area, and the like, and preferably has a specific size from viewpoints of transmission of an electromagnetic wave such as a millimeter wave and mechanical characteristic in the electromagnetic wave transmitable resin component (II) of the present invention. An average particle size (median diameter) as measured by a laser diffraction method is preferably 20 μm or smaller, more preferably 15 μm or smaller, and further preferably in a range from 1 to 10 μm.

Carbonblack is not particularly limited in terms of specific surface area, ash content, and the like, and preferably has a specific size, from viewpoints of transmission of an electromagnetic wave such as a millimeter wave, appearance, mechanical characteristic, and the like in the electromagnetic wave transmitable resin component (II) of the present invention. An average particle size as measured by, for example, observation with an electron microscope is preferably in a range from 10 to 70 nm, and more preferably from 20 to 50 nm.

The alumina particle is not particularly limited in terms of specific surface area and types of impurity elements, and is preferably a spherical particle having a specific size, from viewpoints of transmission of an electromagnetic wave such as a millimeter wave, mechanical characteristic, and the like in the electromagnetic wave transmitable resin component (II) of the present invention. An average particle size as measured by, for example, observation with an electron microscope is preferably in a range from 5 to 80 μm, and more preferably from 5 to 30 μm.

When the resin material (X) contains an inorganic filler, a content ratio thereof is preferably in a range from 0.1 to 40 parts by mass, more preferably from 0.3 to 30 parts by mass, and further preferably from 0.5 to 20 parts by mass based on 100 parts by mass of a total amount of the resin component, from viewpoints of transmission of an electromagnetic wave such as a millimeter wave and mechanical characteristic in the electromagnetic wave transmitable resin component (II) of the present invention.

A content of the inorganic filler in the case where the resin material (X) contains the inorganic filler is preferably in a range from 0.1 to 40 parts by mass, more preferably from 0.3 to 30 parts by mass, and further preferably from 0.5 to 20 parts by mass, based on 100 parts by mass of a total content of the resin components, from viewpoints of transmission of an electromagnetic wave such as a millimeter wave, appearance, mechanical characteristic, and the like in the electromagnetic wave transmitable resin component (II) of the present invention.

When the inorganic filler contains a talc particle or an alumina particle, a content ratio thereof is preferably in a range from 0.5 to 40 parts by mass, more preferably from 1 to 30 parts by mass, and further preferably from 3 to 20 parts by mass based on 100 parts by mass of a total content of the resin components.

When the inorganic filler contains carbonblack, a content ratio thereof is preferably in a range from 0.1 to 10 parts by mass, more preferably from 0.2 to 5 parts by mass, and further preferably from 0.3 to 3 parts by mass based on 100 parts by mass of a total content of the resin components.

The inorganic filler may be of a combination of a talc particle or an alumina particle with carbonblack. In this case, the content ratios of the talc particle or alumina particle and carbonblack are preferably 0.3 to 30 parts by mass and 0.1 to 10 parts by mass, more preferably 0.5 to 20 parts by mass and 0.2 to 5 parts by mass, and further preferably 2 to 15 parts by mass and 0.3 to 3 parts by mass, respectively, based on 100 parts by mass of a content of the resin component.

Alternatively, carbonblack may be combined with other inorganic filler excluding talc particle and alumina particle. In this case, the content ratios of carbonblack and other inorganic filler are preferably 0.1 to 10 parts by mass and 0.1 to 30 parts by mass, more preferably 0.2 to 5 parts by mass and 0.2 to 20 parts by mass, and further preferably 0.3 to 3 parts by mass and 0.5 to 15 parts by mass, respectively, based on 100 parts by mass of a content of the resin component.

The thermoplastic resin composition constituting the resin material (X) according to the present invention may contain other additive. Examples of the other additive include a filler which prevents the decrease of the dielectric constant of the electromagnetic wave transmitable resin component (I) or improves mechanical characteristic, a plasticizer, an antioxidant, an ultraviolet absorber, an antiaging agent, a flame retardant, a stabilizer, a weathering agent, a light stabilizer, a heat stabilizer, an antistatic agent, a water repellent, an oleum repellent, an anti-foaming agent, an antibacterial agent, an antiseptic, a coloring agent (for example, a pigment and a dye), and the like.

A dielectric loss tangent of the resin material (X) at a frequency of about 77 GHz is preferably $9.0 \times 10^{-3}$ or less, more preferably $8.3 \times 10^{-3}$ or less, further preferably $7.5 \times 10^{-3}$ or less, and particularly $5.5 \times 10^{-3}$ or less.

A thickness of the base resin layer is usually in a range from 0.5 to 3 mm, and the thickness may be uniform over the whole, or may be partially different.

The resin material (Y) constituting the transparent resin layer may be a thermoplastic resin composition or a cured resin composition, but is preferably a thermoplastic resin composition. The thermoplastic resin (hereinafter, referred to as "third thermoplastic resin") contained in the thermoplastic resin composition is not particularly limited. Example thereof includes a cellulose derivative such as cellulose triacetate (TAC) and cellulose diacetate; a polyester resin such as polyethylene terephthalate and polybutylene terephthalate; a polyarylate resin; a polysulfone-based resin such as polysulfone and polyether sulfone; a polyether ketone-based resin such as polyether ketone and polyether ether ketone; a polycarbonate resin; an acrylic resin such as poly(methyl methacrylate); a polyolefin resin; a cyclic polyolefin resin; a polyvinylidene chloride resin; a styrene-based resin such as polystyrene; a polyvinyl acetate; a polyvinyl alcohol; and the like. Among these, a polycarbonate resin and an acrylic resin are preferable. The polycarbonate resin may be same as or different from the resin (R4). The acrylic resin may be same as or different from the resin (R3).

The thermoplastic resin composition constituting the resin material (Y) according to the present invention may contain an additive within the range which will not impair its transparency. Examples of the additive include a plasticizer, an antioxidant, an ultraviolet absorber, an antiaging agent, a flame retardant, a stabilizer, a weathering agent, a light stabilizer, a heat stabilizer, an antistatic agent, a water repellent, an oleum repellent, an anti-foaming agent, an antibacterial agent, an antiseptic, a coloring agent (for example, a pigment and a dye), and the like.

A dielectric loss tangent of the resin material (Y) at a frequency of about 77 GHz is preferably $9.0 \times 10^{-3}$ or less, more preferably $8.5 \times 10^{-3}$ or less, and further preferably $7.8 \times 10^{-2}$ or less.

A thickness of the transparent resin layer is usually in a range from 0.5 to 3 mm, and the thickness may be uniform over the whole, or may be partially different.

Preferred embodiments as the electromagnetic wave transmitable resin component (II) of the present invention are described below.

(1) A resin laminate wherein a base resin layer is mainly composed of resins (R1) and (R5), and a transparent resin layer is mainly composed of a resin (R3) or (R4).

(2) A resin laminate wherein a base resin layer is mainly composed of resins (R1), (R2), and (R5), and a transparent resin layer is mainly composed of resin a (R3) or (R4).

(3) A resin laminate wherein a base resin layer is mainly composed of resins (R1), (R4), and (R5), and a transparent resin layer is mainly composed of a resin (R3) or (R4).

In the electromagnetic wave transmitable resin component (II) of the present invention, a difference between the dielectric constant of the resin material (X) and the dielectric constant of the resin material (Y) is 0.05 or less, preferably 0.04 or less, and more preferably 0.03 or less. When the difference between the dielectric constant of the resin material (X) and the dielectric constant of the resin material (Y) is more than 0.05, reflection of the electromagnetic wave at a boundary between the resin material (X) and the resin material (Y) may be increased, and transmission of the electromagnetic wave may be decreased.

The electromagnetic wave transmitable resin component (II) of the present invention may further include, as necessary, other layers. Examples of the other layer include a decorative layer which may transmit or not transmit an electromagnetic wave, a shielding layer which absorbs or reflects an electromagnetic wave, a surface protective layer which transmits an electromagnetic wave, and the like. These layers may include an inorganic material such as metal, alloy, oxide, nitride and carbide; an organic material such as a resin; and the like.

A dielectric loss tangent of the electromagnetic wave transmitable resin component (II) of the present invention in a region penetrating an electromagnetic wave in the cross section direction is preferably $9.0 \times 10^{-3}$ or less, more preferably $8.3 \times 10^{-3}$ or less, and even more preferably $7.8 \times 10^{-3}$ or less at a frequency of about 77 GHz.

The electromagnetic wave transmitable resin component (II) of the present invention is suitable as the radome of the present invention, a decorative member, or the like.

Figure 8:
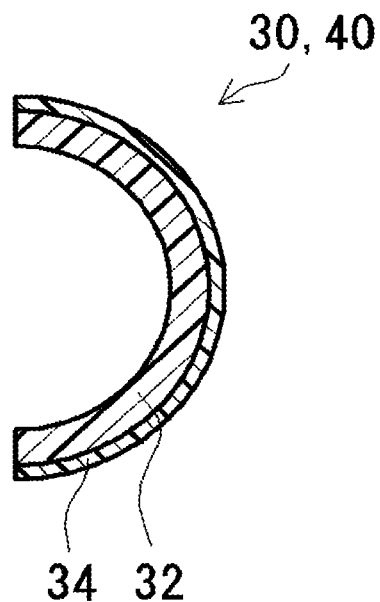
FIG. 8 is a schematic cross sectional view of an example of an electromagnetic wave transmitable resin component (II) composed of a resin laminate or a radome in the present invention.
Figure 9:
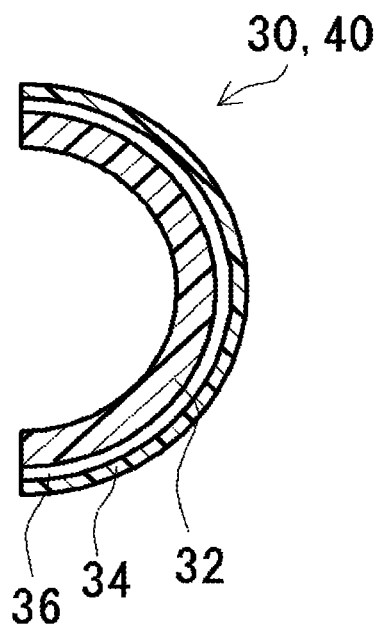
FIG. 9 is a schematic cross sectional view of another example of an electromagnetic wave transmitable resin component (II) composed of a resin laminate or a radome in the present invention.
Figure 10:
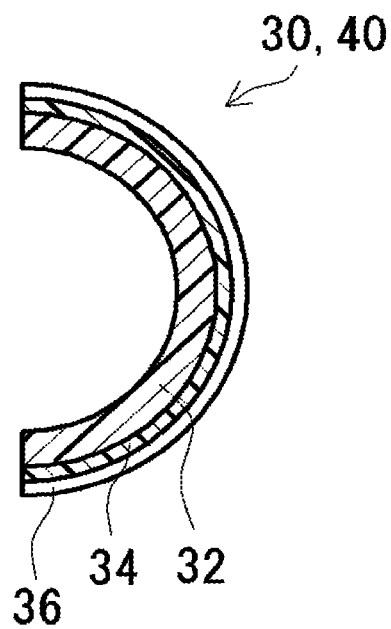
FIG. 10 is a schematic cross sectional view of another example of an electromagnetic wave transmitable resin component (II) composed of a resin laminate or a radome in the present invention.
Figure 11:
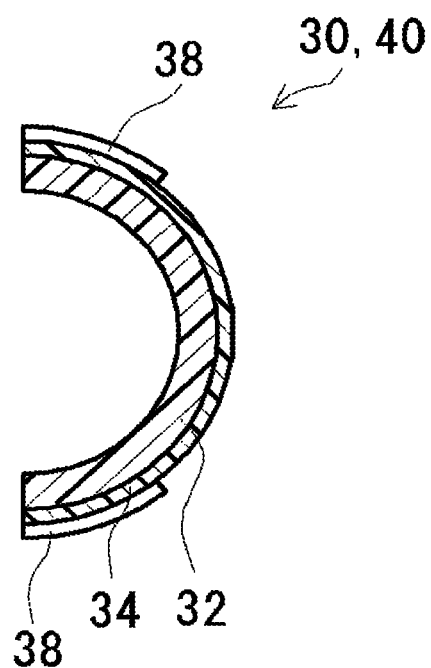
FIG. 11 is a schematic cross sectional view of another example of an electromagnetic wave transmitable resin component (II) composed of a resin laminate or a radome in the present invention.

An electromagnetic wave transmitable resin component 30 or a radome 40 consisting of a base resin layer 32 and a transparent resin layer 34 is depicted in FIG. 8, and an electromagnetic wave transmitable resin component 30 or radome 40 including other layer is depicted in FIGS. 9 to 11. FIGS. 8 to 11 depict a hemispherical structure having a curved surface, but the structures of the electromagnetic wave transmitable resin component 30 or radome 40 of the present invention are not limited to those having a curved surface, but may have a flat portion.

FIG. 8 depicts the electromagnetic wave transmitable resin component 30 and the radome 40 including the base resin layer 32 and the transparent resin layer 34. FIG. 9 depicts the electromagnetic wave transmitable resin component 30 and the radome 40 including a decorative layer 36, which transmits an electric wave, between the base resin layer 32 and the transparent resin layer 34. FIG. 10 depicts the electromagnetic wave transmitable resin component 30 and the radome 40 which include, in this order, the base resin layer 32, the transparent resin layer 34, and the decorative layer 36 which transmits an electromagnetic wave. FIG. 11 depicts the electromagnetic wave transmitable resin component 30 and the radome 40 which include, in this order, the base resin layer 32, the transparent resin layer 34, and a shielding layer 38, which absorbs or reflects an electromagnetic wave, arranged on a part of the surface of the transparent resin layer 34. The whole of the radome of the present invention may be composed solely of the electromagnetic wave transmitable resin component (II) of the present invention, or only the part corresponding the channel involved in transmission or reception of an electromagnetic wave may be solely composed of the electromagnetic wave transmitable resin component (II) of the present invention.

The electromagnetic wave transmitable resin component 30 or the radome 40 in FIG. 8 can be produced by preparing a molded article for either of the base resin layer 32 or the transparent resin layer 34, and then subjecting the other material to injection molding. The electromagnetic wave transmitable resin component 30 or the radome 40 in FIG. 9 can be produced by preparing a molded article for the base resin layer 32 or a molded article for the transparent resin layer 34, forming a decorative layer 36 on the surface at the side of the transparent resin layer 34 of the molded article for the base resin layer 32 or at the surface side of the base resin layer 32 of the molded article for the transparent resin layer 34, by, for example, applying or printing the material for forming the decorative layer 36, and then subjecting the remaining material for forming the base resin layer 32 or the transparent resin layer 34 to injection molding. Additionally, the electromagnetic wave transmitable resin component 30 or the radome 40 in FIGS. 10 and 11 can be produced by preparing an molded article for the base resin layer 32 or the transparent resin layer 34, subjecting the other material to injection molding, and then forming a decorative layer 36 or a shielding layer 38 by, for example, applying or printing the material for forming the decorative layer 36 or the shielding layer 38 on the surface of the transparent resin layer 34.

Figure 12:
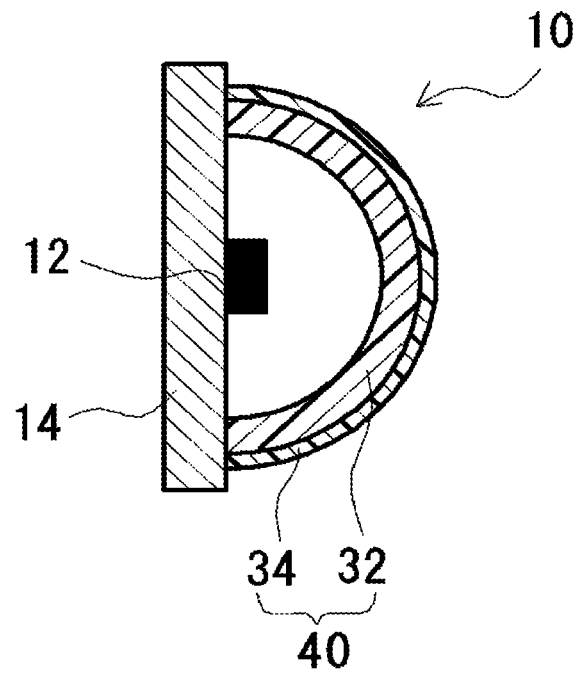
FIG. 12 is a schematic cross sectional view of an example of a radar equipment including the electromagnetic wave transmitable resin component (II) of the present invention.
Figure 13:
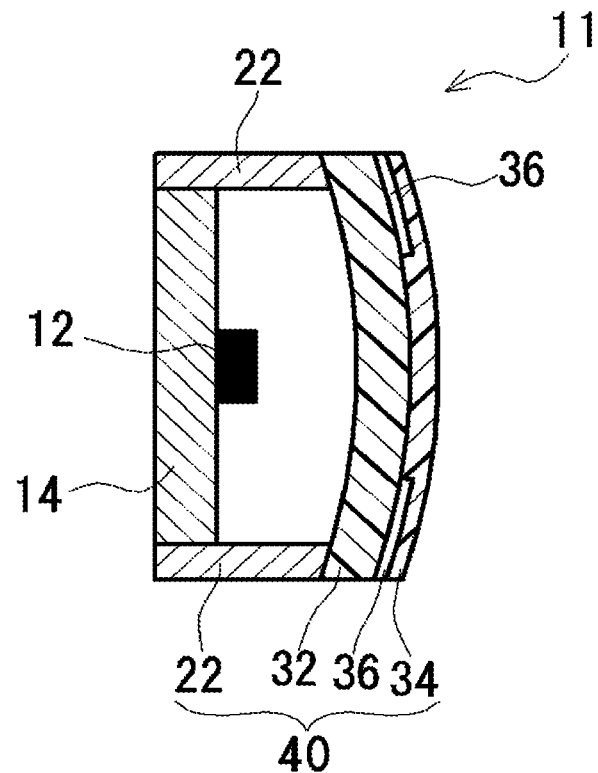
FIG. 13 is a schematic cross sectional view of a millimeter wave radar equipment as an example of the radar equipment including the electromagnetic wave transmitable resin component (II) of the present invention.

The radome of the present invention including the electromagnetic wave transmitable resin component (II) is a component storing or protecting an antenna module which transmits or receives an electromagnetic wave such as a millimeter wave, and leads to a radar equipment of the present invention which is suitable for wireless communication, sensors, and the like (see FIGS. 12 and 13).

Both of FIGS. 12 and 13 depict a radar equipment wherein the antenna module 12 which can transmit and receive by itself is stored in or protected by the radome 40.

The antenna module 12 may be, for example, arranged on the antenna base 14 made of a resin or an inorganic material (for example, metal or ceramics). The radome 40 may be arranged on the antenna base 14 directly or via other member. Additionally, in FIGS. 12 and 13, the antenna base 14 is a flat plate, but may be a curved surface plate or has an uneven cross section or a zigzag cross section.

The radar equipment 10 in FIG. 12 is an embodiment including the radome 40 composed of a hemispherical resin laminate having a uniform wall thickness over the whole, and allows transmission and reception of an electromagnetic wave such as a millimeter wave by the antenna base 14 over the whole right side of the drawing.

FIG. 13 is a schematic view of the millimeter wave radar equipment 11 as a component of, for example, a sensor suitable for adaptive cruise control (A.C.C.), which is attracting an attention as a core technique in intelligent transport system (ITS) aimed at moderation of traffic congestion and decrease of accidents.

The basic structure of FIG. 13 is composed of the antenna module 12, which is arranged on the antenna base 14, stored in the radome 40 composed of the base resin layer 32, the transparent resin layer 34, the decorative layer 36 arranged between these layers, and the component 22 which absorbs or reflects an electromagnetic wave. The decorative layer 36 may transmit or may not transmit an electromagnetic wave, and forms a design on the front side of a vehicle, whereby the design depicted by the decorative layer 36 can be recognized from the right side of FIG. 13. When the decorative layer 36 transmits an electromagnetic wave, the dielectric constant of the resin laminate composed of the base resin layer 32 and the transparent resin layer 34, and the dielectric constant of the decorative layer 36 are preferably generally same.

EXAMPLE

Hereinafter, the present invention is further described with production examples of an electromagnetic wave transmitable resin component (I), specifically, a hemispherical resin components (20 and 40) shown in FIG. 1 using a thermoplastic resin composition composed of raw materials listed in Tables 1 to 7, and production examples of a resin laminate using a thermoplastic resin composition composed of raw materials listed in Tables 8 and 9. In the following, part and % are based on mass unless otherwise specified.

1. Raw Materials of Resin Component Composed of Resin Compact or Resin Laminate

The raw materials used in Experimental Examples 1-1 to 1-72, and Experimental Examples 2-1 to 2-25 are as described below. Measurement of graft rate and intrinsic viscosity [η] were conducted in accordance with the above-described method.

1-1. Thermoplastic Resin 1-1-1. ABS

It is a rubbery polymer-reinforced resin consisting of 62.8% of a diene-based rubbery polymer-reinforced vinyl-based resin having a graft rate of 55% and 37.2% of an ungrafted acrylonitrile styrene copolymer resin obtained by emulsion polymerization of styrene and acrylonitrile in the presence of a polybutadiene rubber having a gel content of 86% and an average particle size of 290 nm. The graft rate in the diene-based rubbery polymer-reinforced vinyl-based resin was 55%, the content of the polybutadiene rubber in the rubbery polymer-reinforced resin was 40.5%, the content of acrylonitrile unit was 17.0%, and the content of styrene unit was 42.5%. The limiting viscosity [η] of the ungrafted acrylonitrile styrene copolymer resin (acetone soluble component) was 0.45 dl/g (measured in methylethylketone at 30° C.)

1-1-2. AES-1

It is a rubbery polymer-reinforced resin consisting of an ethylene α-olefin-based rubbery polymer-reinforced vinyl-based resin and an ungrafted acrylonitrile styrene copolymer resin, obtained by solution polymerization of styrene and acrylonitrile in a toluene solvent in the presence of an ethylene propylene copolymer rubber having an ethylene unit amount of 78%, and a propylene unit amount of 22%, and having Tm of 40° C. The graft rate in the ethylene α-olefin-based rubbery polymer-reinforced vinyl-based resin was 55%, the content of the ethylene propylene copolymer rubber in the rubbery polymer-reinforced resin was 30%, the content of acrylonitrile unit was 24%, and the content of styrene unit was 46%. The limiting viscosity [η] of the ungrafted acrylonitrile styrene copolymer resin (acetone soluble component) was 0.5 dl/g (measured in methylethylketone at 30° C.).

1-1-3. AES-2

It is a rubbery polymer-reinforced resin consisting of an ethylene α-olefin-based rubbery polymer-reinforced vinyl-based resin and an ungrafted acrylonitrile styrene copolymer resin obtained by polymerizing styrene and acrylonitrile in a toluene solvent in the presence of ethylene propylene dicyclopentadiene copolymer rubber having an ethylene unit amount of 63%, a propylene unit amount of 32% and a dicyclopentadiene unit amount of 5%, and having a money viscosity ($ML_{1+4}$, 100° C.) of 33. The graft rate in the ethylene α-olefin based rubbery polymer-reinforced vinyl-based resin was 60%, the content of the ethylene propylene dicyclopentadiene copolymer rubber contained in the rubbery polymer-reinforced resin was 30%, the content of acrylonitrile unit was 23%, and the content of styrene unit was 47%. The limiting viscosity [η] of the ungrafted acrylonitrile styrene copolymer resin (acetone soluble component) was 0.45 dl/g (measured in methylethylketone at 30° C.)

1-1-4. AES-3

It is a rubber-reinforced resin consisting of 46.6% of an ethylene α-olefin-based rubbery polymer-reinforced vinyl-based resin and 53.4% of an ungrafted acrylonitrile styrene copolymer resin obtained by solution polymerization of styrene and acrylonitrile in a toluene solvent in the presence of ethylene propylene copolymer rubber having an ethylene unit amount of 78%, and a propylene unit amount of 22%, and having Tm of 40° C. The graft rate in the ethylene α-olefin-based rubbery polymer-reinforced vinyl-based resin was 50%, the content of the ethylene propylene copolymer rubber contained in the rubber-reinforced resin was 31.1%, the content of acrylonitrile unit was 20.7%, and the content of styrene unit was 48.2%. The intrinsic viscosity [n] of the ungrafted acrylonitrile styrene copolymer resin (acetone soluble component) was 0.35 dl/g (measured in methylethylketone at 30° C.)

1-1-5. AES-4

It is a rubber-reinforced resin consisting of 46.7% of an ethylene α-olefin-based rubbery polymer-reinforced vinyl-based resin and 53% of an ungrafted acrylonitrile styrene copolymer resin obtained by polymerizing styrene and acrylonitrile in a toluene solvent in the presence of ethylene propylene dicyclopentadiene copolymer rubber having an ethylene unit amount of 63%, a propylene unit amount of 32% and a dicyclopentadiene unit amount of 5%, and having a mooney viscosity ($ML_{1+4}$, 100° C.) of 33. The graft rate in the ethylene α-olefin-based rubbery polymer-reinforced vinyl-based resin was 53.3%, the content of the ethylene propylene dicyclopentadiene copolymer rubber contained in the rubber-reinforced resin was 30.5%, the content of acrylonitrile unit was 21.0%, and the content of styrene unit was 48.5%. The intrinsic viscosity [η] of the ungrafted acrylonitrile styrene copolymer resin (acetone soluble component) was 0.38 dl/g (measured in methylethylketone at 30° C.)

1-1-6. AES-5

It is a rubber-reinforced resin consisting of 46.5% of an ethylene α-olefin-based rubbery polymer-reinforced vinyl-based resin and 53.5% of an ungrafted acrylonitrile styrene copolymer resin obtained by solution polymerization of styrene and acrylonitrile in a toluene solvent in the presence of ethylene propylene copolymer rubber having an ethylene unit amount of 78%, and a propylene unit amount of 22%, and having Tm of 40° C. The graft rate in the ethylene α-olefin-based rubbery polymer-reinforced vinyl-based resin was 50%, the content of the ethylene propylene copolymer rubber contained in the rubber-reinforced resin was 31.0%, the content of acrylonitrile unit was 17.4%, and the content of styrene unit was 51.6%. The intrinsic viscosity [n] of the ungrafted acrylonitrile styrene copolymer resin (acetone soluble component) was 0.35 dl/g (measured in methylethylketone at 30° C.)

1-1-7. PX(DR)

It is a rubbery polymer-reinforced resin consisting of a hydrogenated diene-based rubbery polymer-reinforced vinyl-based resin and an ungrafted methyl methacrylate acrylonitrile styrene copolymer resin obtained by polymerizing methyl methacrylate, styrene and acrylonitrile in a toluene solvent in the presence of a hydrogenated styrene ethylene butylene ethylene block copolymer "DYNARON 4600P" (trade name) manufactured by JSR Corporation. The graft rate in the hydrogenated diene-based rubbery polymer-reinforced vinyl-based resin was 45%, the content of the hydrogenated diene-based rubber contained in the rubbery polymer-reinforced resin was 30%, the content of methyl methacrylate unit was 50%, the content of acrylonitrile unit was 10%, and the content of styrene unit was 10%. The limiting viscosity [n] of the ungrafted methyl methacrylate acrylonitrile styrene copolymer resin (acetone soluble component) was 0.48 dl/g (measured in methylethylketone at 30° C.).

1-1-8. ASA

Into a glass flask equipped with a stirrer, 85 parts of deionized water, 0.7 part of potassium rosinate, 0.45 part of sodium hydrogen carbonate, 0.15 part of sodium carbonate, 0.5 part of sodium salt of formalin naphthalene sulfonate condensate, and 0.03 part of sodium dithionate were charged in a nitrogen gas flow. As a monomer, 5 parts of n-butyl acrylate were added, and heated under stirring. When the internal temperature reached 75° C., 0.12 part of potassium persulfate was added to initiate polymerization. The polymerization was conducted for 1 hour, and then 0.06 part of potassium persulfate, 44.5 parts of n-butyl acrylate, and 0.5 part of allyl methacrylate were added continuously over a period of 3 hours. The polymerization was continued for further one hour. Thereafter, the object was cooled to a temperature of 65° C., 33 parts of deionized water, 0.8 part of potassium rosinate, and 0.07 part of tert-butyl hydroperoxide were charged, additionally, a solution prepared by dissolving 0.4 part of sodium pyrophosphate, 0.01 part of ferrous sulfate heptahydrate, and 0.3 part of glucose in 15 parts of deionized water, 10.95 parts of styrene, and 4.05 parts of acrylonitrile were added, and heated to 75° C. The polymerization was conducted for 1 hour, and then 25.55 parts of styrene, 9.45 parts of acrylonitrile, 0.1 part of tert-dodecyl mercaptan, and 0.2 part of tert-butyl hydroperoxide were added continuously over a period of 4 hours. The polymerization was continued for further one hour. The object was coagulated with a magnesium sulfate solution, washed with water, and then dried, thus obtaining a rubbery polymer-reinforced resin. The graft rate in the acrylic rubbery polymer-reinforced vinyl-based resin contained in the rubbery polymer-reinforced resin was 40%, the content of the ungrafted acrylonitrile styrene copolymer resin (acetone soluble component) was 30%, and the limiting viscosity [n] of the acetone soluble component was 0.43 dl/g (in methylethylketone, 30° C.)

1-1-9. SX

A mixture of 1.5 parts of p-vinyl phenylmethyl dimethoxy silane and 98.5 parts of octamethyl cyclotetrasiloxane was added to 300 parts of an aqueous solution prepared by dissolving 2.0 parts of dodecylbenzenesulfonic acid in distilled water, stirred with a homomixer for 3 minutes for emulsification dispersion. The emulsification dispersion was transferred to a separable flask equipped with a capacitor, a nitrogen gas inlet, and a stirrer, heated at 90° C. for 6 hours for condensation reaction under stirring, and the reaction was completed by cooling at 5° C. for 24 hours. As a result of this, a latex having a condensation rate of 92.8% and containing a modified polyorganosiloxane rubber was obtained. Thereafter, a sodium carbonate aqueous solution was added to the latex, and neutralized to pH 7. The volume average particle size of the modified polyorganosiloxane rubber was 280 nm.

Subsequently, into a glass flask equipped with a stirrer, 40 parts of the modified polyorganosiloxane rubber, 100 parts of deionized water, 1.5 parts of sodium dodecylbenzene sulphonate, 0.1 part of tert-dodecyl mercaptan, 15 parts of styrene, and 5 parts of acrylonitrile were charged, and heated to a temperature of 45° C. under stirring. Thereafter, an activator solution composed of 0.1 part of sodium ethylenediamine tetraacetate, 0.003 part of ferrous sulfate, 0.2 part of formaldehyde sodium sulfoxylate dehydrate and 15 parts of deionized water, and 0.1 part of diisopropylbenzene hydroperoxide were added to initiate polymerization. After 1 hour, a material for incremental polymerization consisting of 50 parts of deionized water, 1 part of sodium dodecylbenzene sulphonate, 0.1 part of tert-dodecyl mercaptan, 0.2 part of diisopropyl hydroperoxide, 30 parts of styrene and 10 parts of acrylonitrile was continuously added over a period of three hours and polymerization was continued. After completion of addition, stirring was further continued for one hour.

0.2 part of 2,2-methylene-bis(4-ethylene-6-tert-butylphenol) was then added to terminate polymerization, thus obtaining a latex containing a rubbery polymer-reinforced resin. Subsequently, 2 parts of calcium chloride was added to the latex, the resin component was coagulated, and water washing and drying (75° C., 24 hours) were carried out to collect a white powder (rubbery polymer-reinforced resin). The polymerization conversion was 97.2%, the graft rate in the silicone-based rubbery polymer-reinforced vinyl-based resin contained in the rubbery polymer-reinforced resin was 90%, and the limiting viscosity [η] of the acetone soluble component (acrylonitrile styrene copolymer resin) was 0.47 dl/g (in methylethylketone, 30° C.)

1-1-10. AS-1

It is an acrylonitrile styrene copolymer having a styrene unit amount of 70% and an acrylonitrile unit amount of 30%, and the limiting viscosity [η] was 0.40 dl/g (measured in methylethylketone at 30° C.)

1-1-11. AS-2

It is an acrylonitrile styrene copolymer having a styrene unit amount of 75% and an acrylonitrile unit amount of 25%, and the intrinsic viscosity [η] was 0.41 dl/g (measured in methylethylketone at 30° C.).

1-1-12. AS-3

It is an acrylonitrile styrene copolymer having a styrene unit amount of 68% and an acrylonitrile unit amount of 32%, and the intrinsic viscosity [η] was 0.43 dl/g (measured in methylethylketone at 30° C.).

1-1-13. AS-4

It is an acrylonitrile styrene copolymer having a styrene unit amount of 83% and an acrylonitrile unit amount of 17%, and the intrinsic viscosity [η] was 0.40 dl/g (measured in methyl ethyl ketone at 30° C.)

1-1-14. PP

A block type polypropylene "NOVATEC BC6C" (trade name) manufactured by Japan Polypropyrene Corporation was used. Its MFR is 2.5 g/10 minutes at a temperature of 190° C. and under a load of 21.2 N.

1-1-15. SBC

A hydrogenated styrene butadiene butylene styrene block copolymer "TUFFTEC P2000" (trade name) manufactured by Asahi Kasei Chemicals Co., Ltd. was used. Its MFR is 3 g/10 minutes at a temperature of 190° C. and under a load of 2.16 kg.

1-1-16. PP-g-AS

It is a graft resin mixture obtained by polymerizing styrene and acrylonitrile in a toluene solvent in the presence of polypropylene having a MFR of 10 g/10 minutes at a temperature of 230° C. and under a load of 2.16 kg. The graft rate in the graft resin contained in the graft resin composition was 43.3%, the content of polypropylene contained in the graft resin composition was 41%, the content of acrylonitrile unit was 17%, and the content of styrene unit was 42%.

1-1-17. mPO

An acid-modified low molecular weight polypropylene-based resin "UMEX 1001" (trade name) manufactured by Sanyo Chemical Industries, Ltd. was used. Its acid value is 26.

1-1-18. PC

A polycarbonate "NOVAREX 7022PJ" (trade name) manufactured by Mitsubishi Engineering-Plastics Corporation was used. The viscosity-average molecular weight (Mv) is 22,000, and the MFR at a temperature of 240° C. and under a load of 98 N is 9 g/10 minutes.

1-1-19. PMMA

A methacrylic resin "ACRYPET VH" (trade name) manufactured by Mitsubishi Rayon Co., Ltd. was used. Its MFR at a temperature of 230° C. and under a load of 37.3 N is 2.0 g/10 minutes. The dielectric constant at a frequency of 77.0 GHz is 2.58, and the dielectric loss tangent is $7.83 \times 10^{-2}$.

1-2. Inorganic Filler

1-2-1. S-1 (Talc Particles)

"MICRO ACE P-3RC" (trade name) manufactured by Nippon Talc Co., Ltd. was used. The average particle size is 5.0 μm.

1-2-2. S-2 (Master Batch Containing Carbonblack)

"ROYAL BLACK 971G" (trade name) manufactured by Koshigaya Kasei Co., Ltd. was used. This product is a master batch which contains an acrylonitrile styrene copolymer as a base resin, and carbonblack in an amount of 40%.

1-2-3. S-3 (Alumina Particles)

"AO-509" (trade name) manufactured by Admatechs Co., Ltd. was used. The average particle size is 10 μm.

2. Production of Resin Component for Radome and Physical Properties Evaluation (1)

Experimental Examples 1-1 to 1-23 and
Comparative Experimental Example 1-1

Raw material components were mixed with a Henschel mixer at proportions listed in Tables 1 to 3, and then the mixture was fed to biaxial extruder "TEX44αII" (model name) manufactured by Japan Iron & Steel Co., Ltd. and melt-kneaded at a cylinder preset temperature ranging 180° C. to 220° C. to prepare pellets of the thermoplastic resin composition. The pellets were subjected to injection molding, and hemispherical molded articles (numerals 20 and 40 in FIG. 1) having an outside diameter of 50 mm and a wall thickness of 2 mm were obtained. Among them, as to Experimental Examples 1-3, 1-6, 1-12, 1-15, 1-16, and 1-20, the presence or absence of seeds or silver on the surface was visually observed, and the molding appearance was evaluated; no seed or silver was found on the surface of the hemispherical molded article. Additionally, a test piece having a predetermined shape was fabricated using the pellets, and subjected to the following evaluations (1) to (4). The results are listed in Tables 1 to 3.

(1) Dielectric Constant and Dielectric Loss Tangent (Tan δ)

An apparatus manufactured by Agilent Technologies was used to measure a dielectric constant and dielectric loss tangent at a frequency of about 77 GHz by a cut-off cylindrical waveguide method (JIS R 1660-1). The frequency depends on the thickness of the test piece and the dielectric constant, so that the thickness of the test piece for the measurement was 0.244 mm.

(2) Impact Resistance

A charpy impact strength was measured at a temperature of 23° C. in accordance with ISO 179. The unit is "$kJ/m^2$".

(3) Mold Shrinkage

Mold shrinkage rates of the test piece were measured in MD direction and TD direction, respectively, at a temperature of 23° C. in accordance with JIS K 7152-4.
 A: Less than 0.8%
 B: From 0.8% to 1.2%
 C: More than 1.2%

(4) Flowability

A melt mass flow rate was measured at a temperature of 220° C. and under a load of 98 N in accordance with ISO 1133. The unit is "g/10 minutes".

TABLE 1

| | | | Experimental Example | | | | | | | | | | |
|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 |
| Thermo- | ABS | (parts) | 26 | | | | | | | | | |
| plastic | AES-1 | (parts) | | 45 | 35 | 25 | | | | | | |
| resin | AES-2 | (parts) | | | | | 45 | 35 | | | | |
| composition | PX (DR) | (parts) | | | | | | | 45 | 35 | | |
| | ASA | (parts) | | | | | | | | | 30 | |
| | SX | (parts) | | | | | | | | | | 40 |

TABLE 1-continued

|  |  |  | Experimental Example | | | | | | | | | |
|---|---|---|---|---|---|---|---|---|---|---|---|---|
|  |  |  | 1-1 | 1-2 | 1-3 | 1-4 | 1-5 | 1-6 | 1-7 | 1-8 | 1-9 | 1-10 |
|  | AS-1 | (parts) | 44 | 45 | 35 | 25 | 45 | 35 | 45 | 35 | 40 | 30 |
|  | PP | (parts) | 30 | 10 | 30 | 50 | 10 | 30 | 10 | 30 | 30 | 30 |
|  | Total | (parts) | 100 | 100 | 100 | 100 | 100 | 100 | 100 | 100 | 100 | 100 |
|  | Ratio of rubbery polymer (%) | | 10.5 | 13.5 | 10.5 | 7.5 | 13.5 | 10.5 | 13.5 | 10.5 | 15.0 | 16.0 |
| Evaluation | Dielectric constant | | 2.6 | 2.7 | 2.6 | 2.5 | 2.7 | 2.6 | 2.7 | 2.6 | 2.6 | 2.5 |
|  | tan$\delta$ ($\times 10^{-3}$) | | 5.6 | 7.0 | 4.5 | 3.7 | 8.5 | 5.4 | 7.5 | 4.8 | 5.5 | 4.8 |
|  | Frequency (GHz) | | 77.1 | 77.1 | 76.9 | 77.0 | 76.9 | 76.9 | 77.0 | 77.1 | 77.0 | 76.9 |
|  | Charpy impact strength (kJ/m$^2$) | | 20.0 | 18.0 | 15.5 | 14.0 | 18.5 | 16.0 | 17.5 | 15.0 | 15.0 | 16.0 |
|  | Shrinkage rate | Measured value (%) | 0.8 | 0.7 | 0.9 | 1.1 | 0.7 | 0.9 | 0.7 | 0.9 | 0.9 | 0.9 |
|  |  | Judgement | A | A | B | B | A | B | A | B | B | B |
|  | MFR (g/10 min.) | | 25 | 18 | 27 | 35 | 19 | 27 | 20 | 28 | 30 | 27 |

TABLE 2

|  |  |  | Experimental Example | | | | | | | | | |
|---|---|---|---|---|---|---|---|---|---|---|---|---|
|  |  |  | 1-11 | 1-12 | 1-13 | 1-14 | 1-15 | 1-16 | 1-17 | 1-18 | 1-19 | 1-20 |
| Thermo- | ABS | (parts) | 26 | | | | | | | | | |
| plastic | AES-1 | (parts) | | 35 | 45 | 35 | 35 | | | | | |
| resin | AES-2 | (parts) | | | | | | 35 | 35 | | | |
| compo- | PX (DR) | (parts) | | | | | | | | 35 | | |
| sition | ASA | (parts) | | | | | | | | | 30 | |
|  | SX | (parts) | | | | | | | | | | 40 |
|  | AS-1 | (parts) | 44 | 35 | 45 | 35 | 35 | 35 | 35 | 35 | 40 | 30 |
|  | PP | (parts) | 30 | 30 | 10 | 30 | 30 | 30 | 30 | 30 | 30 | 30 |
|  | SBC | (parts) | | 10 | 10 | | | | | 10 | 10 | 10 |
|  | PP-g-AS | (parts) | 10 | | | 10 | | 10 | | | | |
|  | mPO | (parts) | | | | | 10 | | 10 | | | |
|  | Total | (parts) | 110 | 110 | 110 | 110 | 110 | 110 | 110 | 110 | 110 | 110 |
|  | Ratio of rubbery polymer (%) | | 10.5 | 10.5 | 13.5 | 10.5 | 10.5 | 10.5 | 10.5 | 10.5 | 15.0 | 16.0 |
| Evalu- | Dielectric constant | | 2.6 | 2.6 | 2.7 | 2.5 | 2.5 | 2.5 | 2.5 | 2.6 | 2.6 | 2.6 |
| ation | tan$\delta$ ($\times 10^{-3}$) | | 5.5 | 4.5 | 7.0 | 4.6 | 4.5 | 5.3 | 5.3 | 4.8 | 5.7 | 4.7 |
|  | Frequency (GHz) | | 77.1 | 77.1 | 77.0 | 77.0 | 76.9 | 76.9 | 77.0 | 77.0 | 76.9 | 77.0 |
|  | Charpy impact strength (kJ/m$^2$) | | 22.0 | 17.5 | 20.0 | 17.8 | 17.3 | 18.1 | 17.6 | 17.0 | 18.0 | 18.0 |
|  | Shrinkage rate | Measured value (%) | 0.8 | 0.9 | 0.7 | 0.9 | 0.9 | 0.9 | 0.9 | 0.9 | 0.9 | 0.9 |
|  |  | Judgement | A | B | A | B | B | B | B | B | B | B |
|  | MFR (g/10 min.) | | 22 | 22 | 16 | 25 | 28 | 23 | 27 | 30 | 28 | 27 |

TABLE 3

|  |  |  | Experimental Example | | | Comparative Experimental Example |
|---|---|---|---|---|---|---|
|  |  |  | 1-21 | 1-22 | 1-23 | 1-1 |
| Thermo- plastic resin composition | ABS | (parts) | 37 | | | |
| | AES-1 | (parts) | | 50 | | |
| | AES-2 | (parts) | | | 50 | |
| | AS-1 | (parts) | 63 | 50 | 50 | |
| | PP | (parts) | | | | 100 |
| | Total | (parts) | 100 | 100 | 100 | 100 |
| | Ratio of rubbery polymer (%) | | 15 | 15.0 | 15.0 | 0 |
| Evaluation | Dielectric constant | | 2.7 | 2.6 | 2.7 | 2.4 |
| | tanδ ($\times 10^{-3}$) | | 10.1 | 9.0 | 9.7 | 3.0 |
| | Frequency (GHz) | | 77.0 | 76.9 | 77.0 | 77.1 |
| | Charpy impact strength (kJ/m$^2$) | | 30 | 21 | 23 | 12 |
| | Shrinkage rate | Measured value (%) | 0.6 | 0.7 | 0.7 | 1.5 |
| | | Judgement | A | A | A | C |
| | MFR (g/10 min.) | | 12 | 14 | 15 | 25 |

3. Production of Resin Component for Radome and Physical Properties Evaluation (2)

Experimental Examples 1-24 to 1-38

Raw material components were mixed with a Henschel mixer at proportions listed in Table 4, and then the mixture was fed to biaxial extruder "TEX44αII" (model name) manufactured by Japan Iron & Steel Co., Ltd. and melt-kneaded at a cylinder preset temperature ranging 180° C. to 220° C. to prepare pellets of the thermoplastic resin composition. The pellets were subjected to injection molding, and hemispherical molded articles (numerals 20 and 40 in FIG. 1) having an outside diameter of 50 mm and a wall thickness of 2 mm were obtained. Among them, as to Experimental Examples 1-25, 1-27, 1-31, 1-32, 1-34, and 1-37, the presence or absence of seeds or silver on the surface was visually observed, and the molding appearance was evaluated; no seed or silver was found on the surface of the hemispherical molded article. Additionally, a test piece having a predetermined shape was fabricated using the pellets, and subjected to the following evaluations (1), (2), and (4), and the following evaluation (5). As to Experimental Examples 1-35 to 1-37, the conditions for flowability (4) were set at a temperature of 240° C. and under a load of 98 N. The evaluation results are listed in Table 4. Though not depicted in the table, all the mold shrinkage rates were 1.2% or less.

(5) Heat Resistance

A heat distortion temperature (HDT) was measured under a load of 18.56 kg/cm$^2$ in accordance with ASTM D648. The thickness of the test piece was ½ inch.

TABLE 4

| | | | Experimental Example | | | | | | | | | | | | | | |
|---|---|---|---|---|---|---|---|---|---|---|---|---|---|---|---|---|---|
| | | | 1-24 | 1-25 | 1-26 | 1-27 | 1-28 | 1-29 | 1-30 | 1-31 | 1-32 | 1-33 | 1-34 | 1-35 | 1-36 | 1-37 | 1-38 |
| Thermo- plastic resin compo- sition | AES-3 | (parts) | 57.9 | 38.6 | 19.3 | | | 38.6 | 19.3 | 38.6 | | | | 60 | 45 | 28 | |
| | AES-4 | (parts) | | | | 39.3 | 19.7 | | | | | | | | | | |
| | AES-5 | (parts) | | | | | | | | | 38.7 | 38.7 | 38.7 | | | | |
| | ABS | (parts) | | | | | | | | | | | | | | | 29.6 |
| | AS-2 | (parts) | 42.1 | 61.4 | 80.7 | 60.7 | 80.3 | | | | 61.3 | | | 25 | 20 | 12 | 70.4 |
| | AS-3 | (parts) | | | | | | 61.4 | 80.7 | | | 61.3 | | | | | |
| | AS-4 | (parts) | | | | | | | | 61.4 | | | 61.3 | | | | |
| | PC | (parts) | | | | | | | | | | | | 15 | 35 | 60 | |
| | Total | (parts) | 100 | 100 | 100 | 100 | 100 | 100 | 100 | 100 | 100 | 100 | 100 | 100 | 100 | 100 | 100 |
| | Rubbery polymer reinforced vinyl-based resin in AES-3, AES-4, AES-5, or ABS (%) | | 27.0 | 18.0 | 9.0 | 18.0 | 9.0 | 81.0 | 9.0 | 18.0 | 18.0 | 18.0 | 18.0 | 28.0 | 21.0 | 13.0 | 19.0 |
| | Ratio of rubbery polymer (%) | | 18.0 | 12.0 | 6.0 | 12.0 | 6.0 | 12.0 | 6.0 | 12.0 | 12.0 | 12.0 | 12.0 | 19.0 | 14.0 | 9.0 | 12.0 |
| | Acrylonitrile unit in the aceton-soluble (%) | | 27.2 | 26.3 | 25.6 | 26.4 | 25.6 | 31.5 | 31.8 | 20.3 | 25.1 | 30.3 | 19.1 | —* | —* | —* | 25.5 |
| Evalu- ation | Dielectric constant | | 2.6 | 2.6 | 2.7 | 2.6 | 2.7 | 2.6 | 2.7 | 2.6 | 2.6 | 2.6 | 2.6 | 2.7 | 2.7 | 2.7 | 2.8 |
| | tanδ ($\times 10^{-3}$) | | 8.5 | 7.5 | 7.0 | 8.9 | 8.2 | 9.5 | 9.9 | 6.8 | 6.5 | 8.3 | 6.0 | 8.9 | 8.1 | 6.7 | 11.8 |
| | Frequency (GHz) | | 77.1 | 76.9 | 77.0 | 76.9 | 76.9 | 77.0 | 77.1 | 77.1 | 76.9 | 76.9 | 76.9 | 77.0 | 77.1 | 76.9 | 77.1 |
| | Charpy impact strength (kJ/m$^2$) | | 18.0 | 10.0 | 6.0 | 8.0 | 5.0 | 11.0 | 7.0 | 8.0 | 7.0 | 9.0 | 6.0 | 28.0 | 32.0 | 42.0 | 22.0 |
| | MFR (g/10 min.) | | 43 | 56 | 71 | 56 | 71 | 52 | 67 | 58 | 62 | 61 | 65 | 68 | 60 | 40 | 55 |
| | Heat distortion temperature (° C.) | | 76.0 | 78.0 | 80.0 | 78.0 | 80.0 | 79.0 | 81.0 | 78.0 | 79.0 | 79.0 | 78.0 | 95.0 | 103.0 | 111.0 | 80.0 |

*not measured

4. Production of Resin Component for Radome and Physical Properties Evaluation (3)

Experimental Examples 1-39 to 1-72

Raw material components were mixed with a Henschel mixer at proportions listed in Tables 5 to 7, and then the mixture was fed to biaxial extruder "TEX44αII" (model name) manufactured by Japan Iron & Steel Co., Ltd. and melt-kneaded at a cylinder preset temperature ranging 180° C. to 220° C. to prepare pellets of the thermoplastic resin composition. The pellets were subjected to injection molding, and hemispherical molded articles (numerals 20 and 40 in FIG. 1) having an outside diameter of 50 mm and a wall thickness of 2 mm were obtained. The pellets were used to form a test piece having a certain shape, and then the test piece was subjected to the evaluations (1), (2), (4), and (5). As to Experimental Examples 1-59 to 1-64, the conditions for flowability (4) were set at a temperature of 240° C. and under a load of 98 N. The evaluation results are listed in Tables 5 to 7. In Experimental Examples using carbonblack, since the thermoplastic resin composition was prepared using the master batch (S-2) containing carbonblack, as described above, the calculated value of the inorganic filler to the whole amount of the total amount of the thermoplastic resin containing the base resin of the master batch was put in the section of "Inorganic filler content based on 100 parts of thermoplastic resin (parts)". Though not depicted in the table, all the mold shrinkage rates were 1.2% or less.

TABLE 5

| | | | | Experimental Example | | | | | | | | | | | | |
|---|---|---|---|---|---|---|---|---|---|---|---|---|---|---|---|---|
| | | | | 1-39 | 1-40 | 1-41 | 1-42 | 1-43 | 1-44 | 1-45 | 1-46 | 1-47 | 1-48 | 1-49 | 1-50 | 1-51 | 1-52 |
| Thermo-plastic resin compo-sition | Thermoplastic resin | ABS-5 | (parts) | 38.7 | 38.7 | 38.7 | 38.7 | 38.7 | 38.7 | 38.7 | 38.7 | 38.7 | 38.7 | 38.7 | 38.7 | 80.0 | 38.7 |
| | | AS-3 | (parts) | 61.3 | 61.3 | 61.3 | 61.3 | 61.3 | 61.3 | 61.3 | | | | 61.3 | 61.3 | 20.0 | 61.3 |
| | | AS-4 | (parts) | | | | | | | | 61.3 | | | | | | |
| | | AS-5 | (parts) | | | | | | | | | 61.3 | | | | | |
| | Inorganic filler | S-1 | (parts) | 10.0 | 5.0 | 3.0 | | | | | | | 5.0 | 10.0 | 5.0 | | |
| | | S-2 | (parts) | | | | 3.0 | 1.0 | | | 3.0 | 3.0 | 3.0 | 3.0 | 1.0 | 1.0 | |
| | | S-3 | (parts) | | | | | | 10.0 | 5.0 | | | | | | | |
| | Total of raw materials | | (parts) | 110 | 105 | 103 | 103 | 101 | 110 | 105 | 103 | 103 | 108 | 113 | 106 | 101 | 100 |
| | Rubbery polymer reinforced vinyl-based resin in AES-5 (%) | | | 18.0 | 18.0 | 18.0 | 18.0 | 18.0 | 18.0 | 18.0 | 18.0 | 18.0 | 18.0 | 18.0 | 18.0 | 37.2 | 18.0 |
| | Ratio of rubbery polymer | | | 12.0 | 12.0 | 12.0 | 12.0 | 12.0 | 12.0 | 12.0 | 12.0 | 12.0 | 12.0 | 12.0 | 12.0 | 24.8 | 12.0 |
| | Inorganic filler content based on 100 parts of thermoplastic resin (parts) | | | 10.0 | 5.0 | 3.0 | 1.2 | 0.4 | 10.0 | 5.0 | 1.2 | 1.2 | 6.1 | 11.0 | 5.4 | 0.4 | 0 |
| | Acrylonitrile unit in the aceton-soluble (%) | | | 25.1 | 25.1 | 25.1 | 25.1 | 25.1 | 25.1 | 25.1 | 30.3 | 19.1 | 25.1 | 25.1 | 25.1 | 28.6 | 25.1 |
| Evalu-ation | Dielectric constant | | | 2.8 | 2.7 | 2.6 | 2.8 | 2.7 | 2.8 | 2.7 | 2.8 | 2.7 | 2.8 | 2.8 | 2.8 | 2.6 | 2.6 |
| | tanδ (×10$^{-3}$) | | | 5.5 | 5.8 | 6.1 | 5.9 | 6.0 | 5.9 | 6.3 | 7.2 | 5.5 | 5.2 | 4.9 | 5.2 | 7.1 | 8.9 |
| | Frequency (GHz) | | | 76.9 | 76.9 | 76.9 | 77.0 | 77.0 | 77.1 | 77.1 | 77.1 | 77.1 | 77.1 | 77.1 | 77.1 | 76.9 | 76.9 |
| | Charpy impact strength (kJ/m$^2$) | | | 5.0 | 6.0 | 7.0 | 7.0 | 7.0 | 3.0 | 5.0 | 6.0 | 6.0 | 6.0 | 5.0 | 5.0 | 18.0 | 8.0 |
| | MFR (g/10 min.) | | | 38 | 49 | 55 | 60 | 58 | 43 | 50 | 53 | 57 | 50 | 37 | 50 | 24 | 56 |
| | Heat distortion temperature (° C.) | | | 81 | 80 | 79 | 79 | 79 | 81 | 80 | 78 | 78 | 80 | 81 | 80 | 72 | 78 |

TABLE 6

| | | | | Experimental Example | | | | | | | | | | | |
|---|---|---|---|---|---|---|---|---|---|---|---|---|---|---|---|
| | | | | 1-53 | 1-54 | 1-55 | 1-56 | 1-57 | 1-58 | 1-59 | 1-60 | 1-61 | 1-62 | 1-63 | 1-64 |
| Thermo-plastic resin compo-sition | Thermoplastic resin | AES-3 | (parts) | 38.6 | 38.6 | | | | | | | | | | |
| | | AES-4 | (parts) | | | 39.3 | 39.3 | 39.3 | 39.3 | | | | | | |
| | | AES-5 | (parts) | | | | | | | 45.0 | 45.0 | 45.0 | 45.0 | 45.0 | 45.0 |
| | | AS-3 | (parts) | 61.4 | 61.4 | 60.7 | 60.7 | 60.7 | | 20.0 | 20.0 | 20.0 | 20.0 | 20.0 | 20.0 |
| | | AS-4 | (parts) | | | | | | 60.7 | | | | | | |
| | | PC | (parts) | | | | | | | 35.0 | 35.0 | 35.0 | 35.0 | 35.0 | 35.0 |
| | Inorganic filler | S-1 | (parts) | 10.0 | | 5.0 | 10.0 | | | 10.0 | 5.0 | | | | |
| | | S-2 | (parts) | | 3.0 | | | 3.0 | 1.0 | | | 3.0 | 1.0 | | |
| | | S-3 | (parts) | | | | | | | | | | | 10.0 | |
| | Total of raw materials | | (parts) | 110 | 103 | 105 | 110 | 103 | 101 | 110 | 105 | 103 | 101 | 110 | 100 |
| | Rubbery polymer reinforced vinyl-based resin in AES-3, AES-4, or AES-5 (%) | | | 18.0 | 18.0 | 18.0 | 18.4 | 18.0 | 18.4 | 20.9 | 20.9 | 20.9 | 20.9 | 20.9 | 21.0 |
| | Ratio of rubbery polymer | | | 12.0 | 12.0 | 12.0 | 12.0 | 12.0 | 12.0 | 14.0 | 14.0 | 14.0 | 14.0 | 14.0 | 12.0 |
| | Inorganic filler content based on 100 parts of thermoplastic resin (parts) | | | 10.0 | 1.2 | 5.0 | 10.0 | 1.2 | 0.4 | 10.0 | 5.0 | 1.2 | 0.4 | 10.0 | 0 |
| | Acrylonitrile unit in the aceton-soluble (%) | | | 26.3 | 26.3 | 26.4 | 26.4 | 26.4 | 31.6 | —* | —* | —* | —* | —* | —* |

TABLE 6-continued

| | | Experimental Example | | | | | | | | | | |
|---|---|---|---|---|---|---|---|---|---|---|---|---|
| | | 1-53 | 1-54 | 1-55 | 1-56 | 1-57 | 1-58 | 1-59 | 1-60 | 1-61 | 1-62 | 1-63 | 1-64 |
| Evalu-ation | Dielectric constant | 2.8 | 2.8 | 2.7 | 2.8 | 2.7 | 2.8 | 2.8 | 2.7 | 2.8 | 2.7 | 2.7 | 2.7 |
| | tanδ (×$10^{-3}$) | 6.1 | 6.8 | 7.8 | 6.8 | 8.1 | 7.5 | 6.6 | 7.0 | 6.9 | 7.3 | 7.8 | 8.1 |
| | Frequency (GHz) | 77.0 | 76.9 | 76.9 | 76.9 | 76.9 | 76.9 | 77.1 | 77.1 | 77.1 | 77.1 | 77.1 | 77.1 |
| | Charpy impact strength (kJ/m$^2$) | 9.0 | 10.0 | 7.0 | 5.0 | 8.0 | 9.0 | 28.0 | 30.0 | 31.0 | 31.0 | 25.0 | 32.0 |
| | MFR (g/10 min.) | 36 | 51 | 46 | 41 | 50 | 45 | 49 | 55 | 63 | 60 | 46 | 60 |
| | Heat distortion temperature (° C.) | 78 | 78 | 79 | 80 | 78 | 78 | 105 | 103 | 103 | 103 | 104 | 103 |

*not measured

TABLE 7

| | | | | Experimental Example | | | | | | | |
|---|---|---|---|---|---|---|---|---|---|---|---|
| | | | | 1-65 | 1-66 | 1-67 | 1-68 | 1-69 | 1-70 | 1-71 | 1-72 |
| Thermoplastic resin composition | Thermoplastic resin | AES-5 | (parts) | 35.0 | 35.0 | 35.0 | 35.0 | | | 35.0 | 35.0 |
| | | ABS | (parts) | | | | | 26.0 | 26.0 | | |
| | | AS-3 | (parts) | 35.0 | 35.0 | 35.0 | 35.0 | 44.0 | 44.0 | 35.0 | 35.0 |
| | | PP | (parts) | 30.0 | 30.0 | 30.0 | 30.0 | 30.0 | 30.0 | 30.0 | 30.0 |
| | | SBC | (parts) | | | | 10.0 | 10.0 | 10.0 | | |
| | Inorganic filler | S-1 | (parts) | 5.0 | | | | 10.0 | | | |
| | | S-2 | (parts) | | 3.0 | | 3.0 | | 3.0 | 1.0 | |
| | | S-3 | (parts) | | | 10.0 | | | | | |
| | Total of raw materials | | (parts) | 105 | 103 | 110 | 113 | 120 | 113 | 101 | 100 |
| | Rubbery polymer reinforced vinyl-based resin in AES-5, or ABS (%) | | | 16.3 | 16.3 | 16.3 | 16.3 | 16.3 | 16.3 | 16.3 | 16.3 |
| | Ratio of rubbery polymer | | | 10.9 | 10.9 | 10.9 | 10.9 | 10.5 | 10.5 | 10.9 | 12.0 |
| | Inorganic filler content based on 100 parts of thermoplastic resin (parts) | | | 5.0 | 1.2 | 10.0 | 1.1 | 9.1 | 1.1 | 0.4 | 0 |
| | Acrylonitrile unit in the aceton-soluble (%) | | | —* | —* | —* | —* | —* | —* | —* | —* |
| Evaluation | Dielectric constant | | | 2.7 | 2.7 | 2.7 | 2.7 | 2.7 | 2.7 | 2.6 | 2.6 |
| | tanδ (×$10^{-3}$) | | | 3.6 | 3.9 | 4.1 | 3.9 | 4.8 | 5.1 | 4.9 | 4.5 |
| | Frequency (GHz) | | | 77.1 | 77.1 | 77.1 | 77.1 | 77.0 | 77.0 | 76.9 | 76.9 |
| | Charpy impact strength (kJ/m$^2$) | | | 11.0 | 12.0 | 9.0 | 13.0 | 15.0 | 17.0 | 12.0 | 12.0 |
| | MFR (g/10 min.) | | | 69 | 78 | 62 | 72 | 49 | 53 | 77 | 77 |
| | Heat distortion temperature (° C.) | | | 72 | 73 | 75 | 71 | 71 | 71 | 72 | 72 |

5. Production of Resin Laminate and Physical Properties Evaluation (1)

Experimental Examples 2-1 to 2-14

The PC as a material (Y) was subjected to injection molding using an injection molding machine "IS100GN" (trade name) manufactured by Toshiba Machine Co., Ltd., at a resin temperature of 290° C., a die temperature of 80° C., an injection pressure of 150 MPa, and an injection rate of 60 mm/second to prepare a test piece (120 mm×80 mm×1 mm) for a transparent resin layer.

Subsequently, a material (X) for a base resin layer was subjected to insert injection molding in a state where the test piece for a transparent resin layer thus obtained was inserted into a die for injection molding, and two-color molding was conducted to form a resin laminate (120 mm×80 mm×2 mm) including a transparent resin layer bonded to a base resin layer. The material (X) is a thermoplastic resin composition which was obtained by mixing the components listed in Table 8 or Table 9 with a Henschel mixer, then feeding the mixture to a biaxial kneading machine "TEX44αII" (model name) manufactured by Japan Iron & Steel Co., Ltd., and then melt kneading the object at a cylinder preset temperature ranging from 180° C. to 240° C.; the injection molding was carried out at a resin temperature of 220° C., a die temperature of 50° C., an injection pressure of 100 MPa, and an injection rate of 40 mm/s. When the thermoplastic resin composition as the material (X) was prepared using a master batch containing carbonblack, the calculated value of the inorganic filler to the total amount of the thermoplastic resin containing the base resin of the master batch was put in the section of "Inorganic filler content based on 100 parts of thermoplastic resin (parts)" in the "Configuration" of Table 8.

The material (X) was subjected to the following evaluations.

(1) Dielectric Constant and Dielectric Loss Tangent (Tan δ)

An apparatus manufactured by Agilent Technologies was used to measure a dielectric constant and dielectric loss tangent (tan δ) at a frequency of about 77 GHz by a cut-off cylindrical waveguide method (JIS R 1660-1).

(2) Impact Resistance

A charpy impact strength was measured at a temperature of 23° C. in accordance with ISO 179. The unit is "kJ/m$^2$".

(3) Flowability

A melt mass flow rate was measured at a temperature of 240° C. and under a load of 98 N in accordance with ISO 1133. The unit is "g/10 minutes".

(4) Heat Resistance

A heat distortion temperature (HDT) was measured under a load of 18.56 kg/cm$^2$ in accordance with ASTM D648. The thickness of the test piece was ½ inch.

TABLE 8

|  |  |  |  | Experimental Example | | | | | | | | | | | | | |
|---|---|---|---|---|---|---|---|---|---|---|---|---|---|---|---|---|---|
|  |  |  |  | 2-1 | 2-2 | 2-3 | 2-4 | 2-5 | 2-6 | 2-7 | 2-8 | 2-9 | 2-10 | 2-11 | 2-12 | 2-13 | 2-14 |
| Base resin layer (material X) | Component | AES-5 | (parts) | 38.7 | 38.7 | 45.0 |  |  |  |  |  | 35.0 | 35.0 |  |  |  |  |
|  |  | AES-4 | (parts) |  |  |  | 39.3 | 39.3 | 39.3 | 39.3 | 39.3 |  |  |  |  | 39.3 | 39.3 |
|  |  | AES | (parts) |  |  |  |  |  |  |  |  |  |  | 26.0 |  |  |  |
|  |  | AS-2 | (parts) | 61.3 | 61.3 | 20.0 | 60.7 | 60.7 | 60.7 |  |  | 45.0 | 45.0 | 44.0 |  | 60.7 |  |
|  |  | AS-3 | (parts) |  |  |  |  |  |  | 60.7 | 60.7 |  |  |  |  |  | 60.7 |
|  |  | PC | (parts) |  |  | 35.0 |  |  |  |  |  |  |  |  | 100.0 |  |  |
|  |  | PP | (parts) |  |  |  |  |  |  |  |  | 15.0 | 15.0 | 30.0 |  |  |  |
|  |  | SEC | (parts) |  |  |  |  |  |  |  |  |  |  | 10.0 |  |  |  |
|  |  | S-1 | (parts) |  | 5.0 |  |  |  | 10.0 |  |  | 5.0 | 5.0 |  |  |  |  |
|  |  | S-2 | (parts) | 1.0 | 1.0 | 1.0 | 1.0 | 3.0 |  |  | 1.0 |  | 1.0 | 3.0 |  |  | 3.0 |
|  |  | S-3 | (parts) |  |  |  |  |  |  |  |  |  |  |  |  |  |  |
|  |  | Total of components (parts) |  | 101.0 | 106.0 | 101.0 | 101.0 | 103.0 | 110.0 | 100.0 | 101.0 | 100.0 | 101.0 | 113.0 | 100.0 | 100.0 | 103.0 |
|  | Configuration | Rubbery polymer reinfored vinyl-based resin in AES or ABS (%) |  | 18.0 | 18.0 | 20.9 | 18.4 | 18.4 | 18.4 | 18.4 | 18.4 | 16.3 | 16.3 | 16.3 | 0 | 18.4 | 18.4 |
|  |  | Ratio of rubbery polymer part in material (X) (%) |  | 12.0 | 12.0 | 14.0 | 12.0 | 12.0 | 12.0 | 12.0 | 12.0 | 10.9 | 10.9 | 10.5 | 0 | 12.0 | 12.0 |
|  |  | Ratio of inorganic filler based on 100 parts of thermoplastic resin (parts) |  | 0.4 | 5.4 | 0.4 | 0.4 | 1.2 | 10.0 | 0 | 0.4 | 5.3 | 5.6 | 1.1 | 0 | 0 | 1.2 |
|  | Dielectric constant |  |  | 2.72 | 2.75 | 2.75 | 2.73 | 2.79 | 2.75 | 2.71 | 2.75 | 2.72 | 2.75 | 2.72 | 2.75 | 2.69 | 2.82 |
|  | tanδ (×10$^{-3}$) |  |  | 6.0 | 5.2 | 7.3 | 7.5 | 8.1 | 6.8 | 7.2 | 7.5 | 5.4 | 5.7 | 3.9 | 7.8 | 5.5 | 8.6 |
|  | Frequency (GHz) |  |  | 77.0 | 77.1 | 77.1 | 76.9 | 76.9 | 76.9 | 77.1 | 76.9 | 77.0 | 77.0 | 77.1 | 77.1 | 76.9 | 76.9 |
|  | Charpy impact strength (kJ/m$^2$) |  |  | 7.0 | 5.0 | 31.0 | 8.0 | 8.0 | 5.0 | 6.0 | 9.0 | 12.0 | 12.0 | 13.0 | 15.0 | 5.0 | 9 |
|  | MFR (g/10 min.) |  |  | 58 | 50 | 60 | 50 | 50 | 41 | 53 | 45 | 50 | 48 | 72 | 5 | 38 | 46 |
|  | Heat distortion temperature (° C.) |  |  | 79.0 | 80.0 | 103.0 | 78.0 | 78.0 | 80.0 | 78.0 | 78.0 | 76.0 | 76.0 | 71.0 | 103.0 | 81.0 | 78.0 |
| Transparent resin layer (material Y) | Component |  |  | PC | PC | PC | PC | PC | PC | PC | PC | PC | PC | PC | PC | PC | PC |
|  | Dielectric constant |  |  | 2.75 | 2.75 | 2.75 | 2.75 | 2.75 | 2.75 | 2.75 | 2.75 | 2.75 | 2.75 | 2.75 | 2.75 | 2.75 | 2.75 |
| Evaluation | Difference of dielectric constant between materials (Y) and (X) |  |  | 0.03 | 0.00 | 0.00 | 0.02 | 0.04 | 0.00 | 0.04 | 0.00 | 0.03 | 0.00 | 0.03 | 0.00 | 0.06 | 0.07 |

6. Production of Resin Laminate and Physical Properties Evaluation (2)

Experimental Examples 2-15 to 2-25

The PMMA as a material (Y) was subjected to injection molding using an injection molding machine "IS100GN" (trade name) manufactured by Toshiba Machine Co., Ltd., at a resin temperature of 230° C., a die temperature of 50° C., an injection pressure of 110 MPa, and an injection rate of 40 mm/second to prepare a test piece (120 mm×80 mm×1 mm) for a transparent resin layer.

Subsequently, a material (X) for a base resin layer was subjected to insert injection molding in a state where the test piece for a transparent resin layer thus obtained was inserted into a die for injection molding, and two-color molding was conducted to form a resin laminate (120 mm×80 mm×2 mm) including a transparent resin layer bonded to a base resin layer. The material (X) is a thermoplastic resin composition which was obtained by mixing the components listed in Table 9 with a Henschel mixer, then feeding the mixture to a biaxial kneading machine "TEX44αII" (model name) manufactured by Japan Iron & Steel Co., Ltd., and then melt kneading the object at a cylinder preset temperature ranging from 180° C. to 240° C.; the injection molding was carried out at a resin temperature of 220° C., a die temperature of 50° C., an injection pressure of 100 MPa, and an injection rate of 40 mm/s. When the thermoplastic resin composition as the material (X) was prepared using a master batch containing carbonblack, the calculated value of the inorganic filler to the total amount of the thermoplastic resin containing the base resin of the master batch was put in the section of "Inorganic filler content based on 100 parts of thermoplastic resin (parts)" in the "Configuration" of Table 9.

The material (X) was subjected to measurements of dielectric constant, dielectric loss tangent, charpy impact strength, MFR, and heat distortion temperature.

TABLE 9

| | | | | Experimental Example | | | | | | | | | | |
|---|---|---|---|---|---|---|---|---|---|---|---|---|---|---|
| | | | | 2-15 | 2-16 | 2-17 | 2-18 | 2-19 | 2-20 | 2-21 | 2-22 | 2-23 | 2-24 | 2-25 |
| Base resin layer (material X) | Component | AES-5 | (parts) | 80.0 | 80.0 | 35.0 | 35.0 | 35.0 | 35.0 | 60.0 | 80.0 | | | |
| | | AES-4 | (parts) | | | | | | | | | | | 39.3 |
| | | ABS | (parts) | | | | | | | | | 35.0 | | |
| | | AS-2 | (parts) | 20.0 | 20.0 | 35.0 | 35.0 | 30.0 | 30.0 | 20.0 | 20.0 | 25.0 | | 60.7 |
| | | AS-3 | (parts) | | | | | | | | | | | |
| | | PC | (parts) | | | | | | | | 20.0 | | | |
| | | PP | (parts) | | | 30.0 | 30.0 | 30.0 | 30.0 | | | 40.0 | | |
| | | PMMA | (parts) | | | | | | | | | | 100.0 | |
| | | S-1 | (parts) | | | | | 5.0 | 5.0 | | 5.0 | | | |
| | | S-2 | (parts) | | 1.0 | | 1.0 | | 1.0 | | 1.0 | | | |
| | | Total of components (parts) | | 100.0 | 101.0 | 100.0 | 101.0 | 100.0 | 101.0 | 100.0 | 106.0 | 100.0 | 100.0 | 100.0 |
| | Configuration | Rubbery polymer reinforced vinyl-based resin in AES or ABS (%) | | 37.2 | 37.2 | 16.3 | 16.3 | 16.3 | 16.3 | 27.9 | 37.2 | 22.0 | 0 | 18.4 |
| | | Ratio of rubbery polymer part in material (X) (%) | | 24.8 | 24.8 | 10.9 | 10.9 | 10.9 | 10.9 | 18.6 | 24.8 | 14.2 | 0 | 12.0 |
| | | Ratio of inorganic filler based on 100 parts of thermoplastic resin (parts) | | 0 | 0.4 | 0 | 0.4 | 5.3 | 5.6 | 0 | 5.4 | 0 | 0 | 0 |
| | Dielectric constant | | | 2.58 | 2.60 | 2.58 | 2.60 | 2.60 | 2.62 | 2.62 | 2.62 | 2.58 | 2.58 | 2.69 |
| | tanδ (×10$^{-3}$) | | | 6.5 | 7.1 | 4.5 | 4.9 | 4.2 | 4.7 | 8.3 | 7.3 | 6.0 | 7.8 | 5.5 |
| | Frequency (GHz) | | | 76.9 | 76.9 | 76.9 | 76.9 | 76.9 | 76.9 | 76.9 | 76.9 | 76.9 | 77.0 | 76.9 |
| | Charpy impact strength (kJ/m$^2$) | | | 20.0 | 18.0 | 12.0 | 12.0 | 10.0 | 10.0 | 48.0 | 18.0 | 25.0 | 2.0 | 5.0 |
| | MFR (g/10 min.) | | | 25 | 24 | 77 | 77 | 61 | 61 | 16 | 20 | 52 | 35 | 38 |
| | Heat distortion temperature (° C.) | | | 71.0 | 72.0 | 72.0 | 72.0 | 74.0 | 74.0 | 90.0 | 72.0 | 71.0 | 75.0 | 81.0 |
| Transparent resin layer (material Y) | Component | | | PMMA | PMMA | PMMA | PMMA | PMMA | PMMA | PMMA | PMMA | PMMA | PMMA | PMMA |
| | Dielectric constant | | | 2.58 | 2.58 | 2.58 | 2.58 | 2.58 | 2.58 | 2.58 | 2.58 | 2.58 | 2.58 | 2.58 |
| Evaluation | Difference of dielectric constant between materials (Y) and (X) | | | 0.00 | 0.02 | 0.00 | 0.02 | 0.02 | 0.04 | 0.04 | 0.04 | 0.00 | 0.00 | 0.11 |

INDUSTRIAL APPLICABILITY

The electromagnetic wave transmitable resin component, radome, and radar equipment in the present invention can be used as components for a sensor suitable for adaptive cruise control (A.C.C.), which is attracting an attention as a core technique in intelligent transport system (ITS) aimed at moderation of traffic congestion and decrease of accidents.

EXPLANATIONS OF LETTERS OR NUMERALS

10: radar equipment
11: millimeter wave radar equipment
12, 12A, 12B: antenna module
14: antenna base
20: electromagnetic wave transmitable resin component (I)
22: resin component for absorbing or reflecting electromagnetic wave
24: partition
26: other electromagnetic wave transmitable resin component
28: decorative layer
30: electromagnetic wave transmitable resin component (II)
32: base resin layer
34: transparent resin layer
36: decorative layer
38: shielding layer
40: radome

What is claimed is:

1. A resin component disposed in a path of a beam emitted from a radar equipment, the resin component comprising:
   a base resin layer comprising a resin material X, and
   a transparent resin layer comprising a resin material Y
   wherein the transparent resin layer is placed at a first surface side of the base resin layer, and
   a difference between a dielectric constant of the resin material X and a dielectric constant of the resin material Y is 0.05 or less, and
   wherein the resin material (X) comprises a thermoplastic resin and an inorganic filler, the thermoplastic resin comprises at least one selected from a group consisting of a rubbery polymer-reinforced vinyl-based resin, a polyolefin resin, an acrylic resin, and a polycarbonate resin, and a content ratio of the inorganic filler is in a range from 0.1 to 40 parts by mass based on 100 parts by mass of a content of the thermoplastic resin.

2. A resin component disposed in a path of a beam emitted from a radar equipment, comprising a base resin layer containing a resin material (X), and a transparent resin layer containing a resin material (Y) and being placed at a first surface side of the base resin layer, and having a difference between a dielectric constant of the resin material (X) and a dielectric constant of the resin material (Y) of 0.05 or less,
  wherein a dielectric loss tangent of the resin material X is $8.3 \times 10^{-3}$ or less, and
    wherein the inorganic filler comprises at least one selected from a group consisting of a talc particle, carbon black, and an alumina particle.

3. A resin component disposed in a path of a beam emitted from a radar equipment, comprising a base resin layer containing a resin material (X), and a transparent resin layer containing a resin material (Y) and being placed at a first surface side of the base resin layer, and having a difference between a dielectric constant of the resin material (X) and a dielectric constant of the resin material (Y) of 0.05 or less,
  wherein the resin material (X) comprises a thermoplastic resin and an inorganic filler, the thermoplastic resin comprises at least a rubbery polymer-reinforced vinyl-based resin selected from a group consisting of the rubbery polymer-reinforced vinyl-based resin, a polyolefin resin, an acrylic resin, and a polycarbonate resin, and a content ratio of the inorganic filler is in a range from 0.1 to 40 parts by mass based on 100 parts by mass of a content of the thermoplastic resin,
  wherein the thermoplastic resin comprises the rubbery polymer-reinforced vinyl-based resin,
  the rubbery polymer-reinforced vinyl-based resin comprises a polymer part derived from an ethylene α-olefin-based rubber and a vinyl-based resin part, and
  wherein the inorganic filler comprises at least one selected from a group consisting of a talc particle, carbon black, and an alumina particle.

4. The resin component according to claim 1,
  wherein the resin material Y comprises a polycarbonate resin or an acrylic resin.

5. A radome comprising:
the resin component according to claim 1.

6. A radar equipment, comprising:
the radome according to claim 5.

7. A radome comprising:
the resin component according to claim 2.

8. A radar equipment, comprising:
the radome according to claim 7.

9. A radome comprising:
the resin component according to claim 3.

10. A radar equipment, comprising:
the radome according to claim 9.

* * * * *